(12) United States Patent
Corcoran et al.

(10) Patent No.: US 7,551,800 B2
(45) Date of Patent: Jun. 23, 2009

(54) DETECTION OF AIRBORNE FLASH ARTIFACTS USING PREFLASH IMAGE

(75) Inventors: Peter Corcoran, Claregalway (IE); Eran Steinberg, San Francisco, CA (US); Alexandru Drimbarean, Galway (IE); Constantin Vertan, Bucuresti (RO); Adrian Zamfir, Bucuresti (RO)

(73) Assignee: FotoNation Vision Limited, Galway (IE)

( * ) Notice: Subject to any disclaimer, the term of this patent is extended or adjusted under 35 U.S.C. 154(b) by 0 days.

(21) Appl. No.: 11/836,773

(22) Filed: Aug. 9, 2007

(65) Prior Publication Data

US 2008/0069433 A1 Mar. 20, 2008

Related U.S. Application Data

(60) Provisional application No. 60/821,956, filed on Aug. 9, 2006.

(51) Int. Cl.
*G06K 9/40* (2006.01)

(52) U.S. Cl. ...................... 382/275; 382/254

(58) Field of Classification Search ................ 382/162, 382/167, 254, 264, 274, 275; 348/222.1, 348/223.1, 224.1, 371; 358/3.26, 3.27, 515, 358/518
See application file for complete search history.

(56) References Cited

U.S. PATENT DOCUMENTS

| | | | |
|---|---|---|---|
| 6,009,209 A | 12/1999 | Acker et al. | |
| 6,134,339 A | 10/2000 | Luo | |
| 6,285,410 B1 | 9/2001 | Marni | |
| 6,760,486 B1 | 7/2004 | Chiao et al. | |
| 6,859,565 B2* | 2/2005 | Baron | 382/275 |
| 7,027,662 B2* | 4/2006 | Baron | 382/275 |
| 7,031,548 B2 | 4/2006 | Baggs | |
| 7,218,792 B2* | 5/2007 | Raskar et al. | 382/254 |
| 7,359,562 B2* | 4/2008 | Raskar et al. | 382/254 |
| 7,362,895 B2* | 4/2008 | Masumura et al. | 382/167 |
| 7,397,969 B2* | 7/2008 | Enomoto et al. | 382/275 |
| 7,423,674 B2* | 9/2008 | Takeshita | 348/223.1 |
| 2004/0184667 A1 | 9/2004 | Raskar et al. | |
| 2005/0068452 A1 | 3/2005 | Steinberg et al. | |
| 2005/0225648 A1* | 10/2005 | Lin et al. | 348/222.1 |
| 2005/0232509 A1 | 10/2005 | Blake et al. | |
| 2006/0008171 A1* | 1/2006 | Petschnigg et al. | 382/254 |
| 2007/0165960 A1* | 7/2007 | Yamada | 382/254 |
| 2007/0263119 A1* | 11/2007 | Shum et al. | 348/371 |

OTHER PUBLICATIONS

International Search Report and Written Opinion from related application PCT/US2007/075651, dated Oct. 20, 2008.
International Search Report and Written Opinion from related application PCT/IB07/04431, dated Nov. 13, 2008.
PCT International Search Report and Written Opinion, PCT/US2007/075651, Oct. 20, 2008.

* cited by examiner

*Primary Examiner*—Kanji Patel
(74) *Attorney, Agent, or Firm*—Andrew V. Smith

(57) ABSTRACT

Flash image orb artifacts arising from specular reflections from airborne particles are corrected. An image of a scene using flash illumination and a reference image of substantially the same scene are acquired. The reference and flash images are subtracted to generate a difference image. Edge and interior region features of an orb artifact within the difference image are determined. The edge feature is matched with the interior region, and the orb artifact is corrected from the flash image based on the matching.

83 Claims, 13 Drawing Sheets

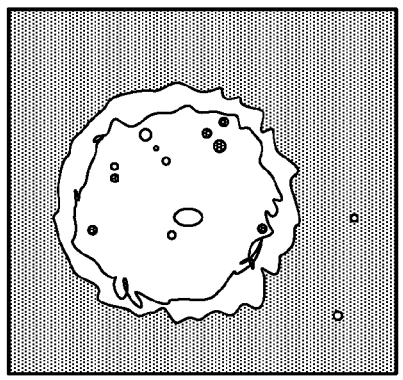
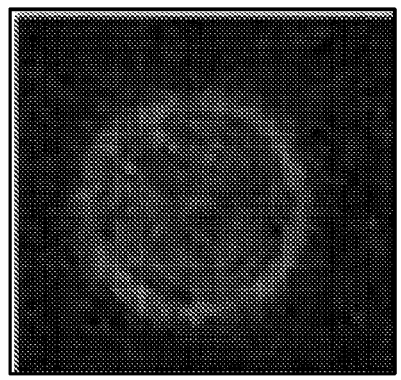
Figure 10A          Figure 10B
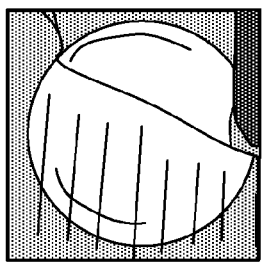
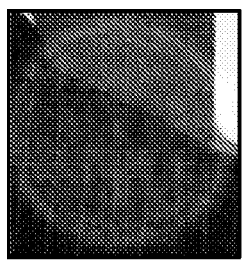
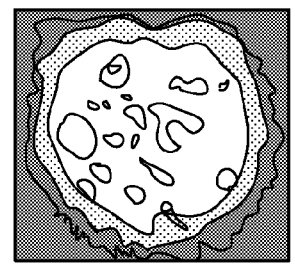
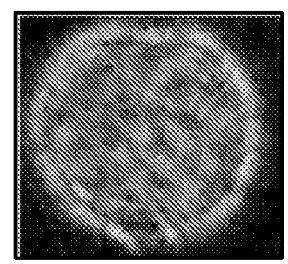
Figure 11A     Figure 11B     Figure 12A     Figure 12B
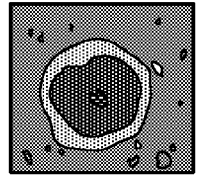
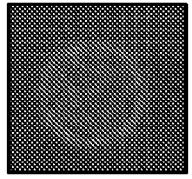
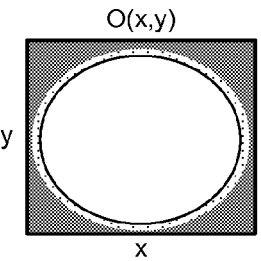
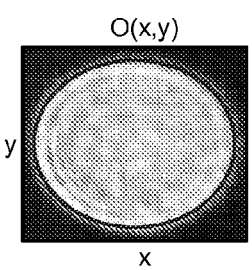
Figure 13A   Figure 13B     Figure 14A     Figure 14B
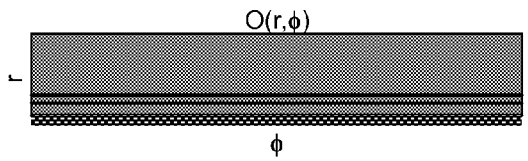
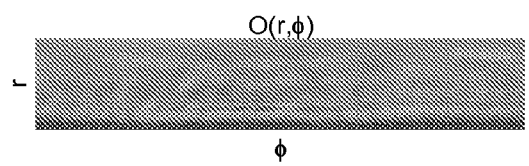
Figure 15A          Figure 15B

DETECTION OF AIRBORNE FLASH ARTIFACTS USING PREFLASH IMAGE

PRIORITY

This patent application claims the benefit of priority to U.S. provisional patent application No. 60/821,956, filed Aug. 9, 2006, which is incorporated by reference.

RELATED APPLICATION

This application is related to a contemporaneously-filed patent application by the same assignee entitled "DETECTION AND CORRECTION OF FLASH ARTIFACTS FROM AIRBORNE PARTICULATES".

BACKGROUND OF THE INVENTION

1. Field of Invention

The invention relates to detection and correction of digital image artifacts that appear in images acquired particularly by compact digital still cameras due to flash reflections from airborne particles such as dust and water vapor (or small waterborne particles in underwater photography) that are placed out of focus.

2. Description of the Related Art

While working with camera companies, there is a constant complaint about "orbs" which are unwanted (or for some wanted) artifacts in flash images due to specular reflections from airborne (or waterborne) particulates. Scientifically they are reflections of water or dust particles. In the more distant past, others have believed them to be manifestations of spirits. Regardless, some people would like to remove them from the images.

Orbs Generally

Orb is the popular name given to anomalies that are typically approximately circular and appear in photographs taken with flash (see Wikopedia™). In photography and video, orbs appear to be balls, diamonds, or smears of light with an apparent size in the image ranging from a golfball to a basketball. Orbs sometimes appear to be in motion, leaving a trail behind them.

There are two main schools of thought regarding the cause of orbs in photo images. The first school sees it as a fairly clear-cut case of flash reflection off of dust, particles, insects, or moisture droplets in the air in front of the camera or at least between the camera and the subject, i.e. they are naturalistic. The opposing school maintains that orbs are paranormal in nature, i.e. non-naturalistic. While some people claim that orbs are more likely to appear in certain locales, or are attracted to human activities (especially those involving children), the images on the internet fora devoted to orbs are taken in graveyards, backyards, attics, and kitchens, as well as bars, convention centers, and city streets—in short, anywhere people may be taking photos.

As orb photos may demonstrably be gained anywhere, the position of "ghost hunters" who claim orb photos are more common in allegedly haunted areas is significantly weakened. That orb photos can be gained anywhere has, however, been adopted into the position of those who maintain that orbs are probes/devices being used by an alien culture to monitor human activities. Orb photos have become so common that some ghost-hunting organizations are no longer accepting submissions of them, or specifying that only "exceptional" examples be presented.

Naturalistic Orbs

Naturalistic orbs are most commonly gained using digital cameras and built-in flash. While photographers with archives of photos report having occasionally seen "orbs" in their photos gained with film cameras, the recent rise in reports of orb photos may be directly related to the common availability of digital cameras and associated rise in the number of pictures taken.

Camera size is another consideration in the recent proliferation of orb photos. As film cameras, and then digital cameras, have steadily shrunk in size, reports of "orbs" increased accordingly. This may be because as cameras have become increasingly smaller, the distance between the lens and the built-in flash has also shrunk, decreasing the angle of reflection back into the lens.

There are a number of naturalistic causes for orbs in photography and videography.
  Solid orbs—Dry particulate matter such as dust, pollen, insects, etc.
  Liquid orbs—Droplets of liquid, usually water, e.g. rain.
  Foreign material on the camera lens
  Foreign material within the camera lens
  Foreign material within the camera body

Solid Orbs

Examples of solid orbs are illustrated at FIGS. 1A-4B. FIG. 1A illustrates a dust orb, referring to the largest circle that is approximately centered left to right near the top of FIG. 1A. FIG. 1B shows a dust orb appearing in a flash photograph, and it is the brightest object in the photograph. Although the background is black, the orb appears in the photograph due to its proximity to the flash and camera lens resulting in sufficient light being specularly reflected back into the camera lens from the camera flash.

FIG. 2A illustrates multiple dust orbs appearing almost as foam due to the presence of many airborne particulates gathered in front of the camera flash and lens. FIG. 2B shows multiple dust orbs appearing in a flash photograph.

FIG. 3A illustrates orbs resulting from specular reflections from thick charcoal dust.

FIG. 3B shows orbs resulting from specular reflections from thick charcoal dust appearing in a flash photograph.

FIG. 4A illustrates orbs resulting from specular reflections from charcoal dust floating in the air. The charcoal dust floating in the air in FIGS. 4A-4B is more sparsely distributed than that of FIGS. 3A-3B. FIG. 4B shows orbs appearing in a flash photograph resulting from specular reflections from charcoal dust floating in the air.

How a Solid Orb is Created

A solid orb, or dust orb, is created because a reflective solid airborne particle, such as a dust particle, is situated near the camera lens and outside the depth of field (DoF), or in other words out of focus. The pinpoint of light reflected from the dust particle that would be seen if it were at the hyperfocal distance (the distance from the film or CCD to the object being photographed, whereby the object is in focus as accurately as possible) grows into a circle of confusion with increasing distance from it.

Liquid Orbs

Examples of liquid orbs are illustrated at FIGS. 5A-8B. FIG. 5A illustrates rain orbs resulting from specular reflections from rain particles in the air with the camera zoomed out. FIG. 5B shows rain orbs appearing in a flash photograph resulting from specular reflections from rain particles in the air with the camera zoomed out.

FIG. 6A illustrates rain orbs resulting from specular reflections from rain particles in the air with the camera zoomed in. FIG. 6B shows rain orbs appearing in a flash photograph resulting from specular reflections from rain particles in the air with the camera zoomed in.

FIG. 7A illustrates rain orbs with coma (tails) and chromatic aberrations. FIG. 7B shows rain orbs appearing in a flash photograph with coma (tails) and chromatic aberrations visible.

FIG. 8A illustrates a close-up of an orb, clearly showing chromatic aberration. FIG. 8B shows a close-up of an orb in a flash photograph which shows chromatic aberration very clearly.

How a Liquid Orb is Created

A liquid orb is created because a drop of liquid, most often a rain drop, is situated near the camera lens and outside the Depth of field, in other words out of focus. The pinpoint of light reflected from the drop of liquid that would be seen if it were at the Hyperfocal distance (the distance from the film or CCD to the object being photographed whereby the object is in focus as accurately as possible) grows into a Circle of confusion with increasing distance from it. The appearance of the Circle of confusion is modified by aberrations such as Chromatic aberration or Coma.

Non-Naturalistic Orbs

Spirit Orbs are sometimes claimed to exist more densely around certain haunted regions, or to be the spirits of departed loved ones. These types of orbs are sometimes claimed to have faces, sometimes with discernable expressions and sometimes of recognizable persons. Some feel the size of an orb indicates how great of an impact a life force had in its life time. Another view of spirit orbs holds that they are non-human spirits, with blue and red orbs symbolizing angels and the devil respectively. Another interpretation of colors in orbs is sex differentiation—blue for male spirits, and red for female. Spirit orbs are also felt by some to be curious, friendly protectors, particularly of children. Belief in these "orb friends" is reminiscent of the belief in fairies in the early part of the twentieth century. The paranormal belief in orbs is not so straightforward as those who believe that they are simply photographic artifacts. While an oft-encountered quote is "orbs are considered by some people to be the simplest and most common form of a disembodied spirit", this concept is not supported by all within the paranormal faction.

Even those "true believers" who steadfastly maintain that orbs are of paranormal origin are often forced to concede that dust may be the cause of most orb photos. A subset of these believers say that they can tell the difference between "dust orbs" and "real" (spirit) orbs, sometimes from a close examination of the image, other times because of how they felt or were acting at the moment the photo was taken. Some true believers say that the orbs respond to spoken requests to appear, move, or appear as different colors. The problem seems to have been mostly investigated in the field of ghost hunting and paranormal activities—as strange and funny as this might sound (http://www.ghostweb.com/orb_theory.html). The problem there was that the digital images acquired with flash (mostly during the night) exhibit severe reflections of the flash on dust, pollen, or water particles that float out of focus. The resulting circular artifacts are named "orbs" (http://en.wikipedia.org/wiki/Orb_%28paranormal%29, see above and hereby incorporated by reference). The phenomenon is recognized to be caused if a particle lies near the camera lens and out of the depth of field area, any pinpoint light source growing into a circle of confusion.

Correction of Photographic Artifacts

Kodak has worked on detection and correction of defective-colored eyes (thus, round shapes). U.S. Pat. No. 7,035,462, which is hereby incorporated by reference, is entitled "apparatus and method for processing digital images having eye color defects". The Abstract of the '462 patent describes "an apparatus and method for processing digital images having eye color defects, and goes on to state that in one method for detecting and correcting eye color defects of a subject in a digital image, the steps comprise: (a) processing the digital image to automatically detect one or more candidate positions of eye color defects in the digital image; (b) automatically applying an eye color defect algorithm to the digital image at the detected candidate positions to automatically correct for the eye color defect; (c) displaying, on a display, at least a portion of the digital image comprising at least one of the corrected eye color defects; and (d) displaying, on the display, an indicator located proximate the at least one of the corrected eye color defects indicative of the at least one of the corrected eye color defects."

The correction of artifacts is also discussed at U.S. Pat. No. 7,031,548, April 2006, hereby incorporated by reference, by S. C. Baggs (Hewlett-Packard Development Company), entitled, Method and apparatus for filtering noise from a digital image. The Abstract states "As is known in the art, it becomes progressively difficult to identify an image region as being caused by noise as the area of that image region increases. The present invention encompasses the discovery that image data associated with smaller noise regions tends to mirror image data associated with larger noise regions. In accordance with the present invention, known techniques are used to accurately identify smaller noise regions. The image data extracted from these smaller noise regions is then used to aid in the identification of larger noise regions. Accordingly, the present invention increases the area of noise regions capable of being accurately identified compared to prior art noise identification techniques. Once large and small noise regions have been identified, the noise regions can be filtered using techniques known in the art."

U.S. Pat. No. 6,614,946, which is hereby incorporated by reference, is entitled "system and method for correcting defects in digital images through selective fill-in from surrounding areas". Its Abstract states "a system and method for correcting defects in an image. A correction area surrounding the defective pixel is dynamically chosen to include a predetermined percentage of non-defective pixels. The percentage is varied as a function of the size of the surrounding region, such that the percentage decreases as the size of the region increases. The shape of the surrounding area may be varied to further enhance the correction procedure. A center of gravity is maintained around the defective pixel by defining subregions surrounding the pixel."

U.S. Pat. No. 6,160,923 is also incorporated by reference in this regard. In addition, U.S. Pat. Nos. 7,206,461, 7,042,505, 6,035,072, and 6,407,777, and US published patent applications 2005/0068452 and 2006/0285754, and U.S. patent application Ser. Nos. 11/674,650, 11/744,020, and 11/673,577, which are assigned to the same assignee as the present application, are also each hereby incorporated by reference.

SUMMARY OF THE INVENTION

Flash image orb artifacts arising from specular reflections from airborne particles are corrected. An image of a scene using flash illumination and a reference image of substantially the same scene are acquired. The reference and flash images are subtracted to generate a difference image. Edge and interior region features of an orb artifact within the difference image are determined. The edge feature is matched with the interior region, and the orb artifact is corrected from the flash image based on the matching.

The flash image and reference image may be normalized prior to subtracting. The method may include upsampling the reference image to match the size of the main flash image and aligning the reference and flash images; and/or normalizing luminance across the reference and flash images. The subtracting may include subtracting the upscaled, aligned and luminance normalized reference and flash images.

The difference image may be scaled and/or thresholded before or after the scaling. Edge detection may be performed prior to the thresholding.

Color calibrating the reference and flash images may be performed based on a transformation of RGB color channels, including matching of colors selected from the reference and flash images within regions at substantial a same location within the scene. The method may include matching background regions of the reference and flash images including global luminance matching, and/or matching foreground regions of the reference and flash images including local luminance matching. The matching of foreground regions may include matching multiple foreground regions including separating the multiple foreground regions based on distance. The separating may be based on distance and may include depth from defocus mapping of the foreground regions. The matching of foreground regions may include color luminance matching, which may include analyzing skin color variation due to luminance variation between the reference and flash images.

The determining of an interior region may include the creation of a map of difference variations within the interior region. The correcting of the orb artifact may include applying the map to determine the correction to be applied to one or more image pixels. The correcting may include applying in-painting technique to correct pixels. Difference variations may be deemed to be too large to allow accurate correction of pixels without applying in-painting.

The correcting of the orb artifact may employ in-painting techniques to correct pixels within the orb edge feature. The method may include anisotropic filtering of the difference image; Canny edge detecting and edge cleaning; computing a distance transform or Vornoi diagram of edges, or both; and/or detecting edge features. Overlapping candidates may be eliminated, which may include determining a survival factor of the specular reflection, and may be based on best survival factor. A final list of candidate reflections may be recorded.

Background regions of the reference and flash images may be matched including glocal luminance matching. Foreground regions of the reference and flash images may also be matched including local luminance matching. A luminance difference map may be generated based on luminance matching at least of the interior region.

A further method of correcting a flash image orb artifact arising from specular reflections from airborne particles is provided. An image is acquired of a scene using flash illumination. A reference image is acquired of substantially the same scene. The reference and flash images are color calibrated based on a transformation of RGB color channels, including matching of colors selected from the reference and flash images within regions at substantially a same location within the scene. An orb artifact is removed from the flash image based on the color calibrating.

The method may include upscaling and aligning the reference and flash images; and/or normalizing luminance across the reference and flash images. The subtracting may include subtracting the upscaled, aligned and luminance normalized reference and flash images. The difference image may be scaled and/or thresholded before or after the scaling. The background regions of the reference and flash images may be matched including glocal luminance matching. The foreground regions of the reference and flash images may also be matched including local luminance matching. The matching of foreground regions includes matching multiple foreground regions including separating the multiple foreground regions based on distance. The separating may be based on distance, and may include depth from defocus mapping of the foreground regions. The matching of foreground regions may include color luminance matching, which may include analyzing skin color variation due to luminance variation between the reference and flash images.

A color difference map may be generated based on the matching of colors. The method may include determining an edge feature of the airborne artifact within the difference image; determining an interior region of the airborne artifact within the difference image; and/or matching the edge feature with the interior region.

The determining of an interior region may include creation of a map of difference variations within the interior region. The correcting of the orb artifact may include applying the map to determine the correction to be applied to one or more image pixels. The correcting may include applying in-painting technique to correct pixels. Difference variations may be deemed to be too large to allow accurate correction of the pixels without applying in-painting. The correcting of the orb artifact may employ in-painting techniques to correct pixels within the orb edge feature.

A further method of correcting a flash image orb artifact arising from specular reflections from airborne particles is provided. An image of a scene is acquired using flash illumination. A reference image is acquired of substantially the same scene. Background regions are matched of the reference and flash images including global luminance matching. Foreground regions of the reference and flash images may also be matched including local luminance matching. An orb artifact may be removed from the flash image based on the foreground or background matching, or both. In the matching of foreground regions, multiple foreground regions may be matched including separating the multiple foreground regions based on distance, which may include depth from defocus mapping of the foreground regions.

The matching of foreground regions may include color luminance matching, which may include analyzing skin color variation due to luminance variation between the reference and flash images.

A luminance difference map may be generated based on global or local luminance matching, or both. Normalized versions of the reference and flash images may be subtracted to generate a difference image. The method may further include determining an edge feature of the airborne artifact within the difference image; determining an interior region of the airborne artifact within the difference image; and/or matching the edge feature with the interior region.

The matching may include both matching background regions of the reference and flash images including global luminance matching, and matching foreground regions of the reference and flash images including local luminance matching. The removing may include removing the orb artifact from the flash image based on both the foreground and background matching.

The determining of an interior region may include the creation of a map of difference variations within the interior region. The correcting of the orb artifact may include applying the map to determine the correction to be applied to one or more image pixels.

The correcting may include applying in-painting technique to correct pixels. Difference variations may be deemed to be too large to allow accurate correction of said pixels without applying in-painting. The correcting of the orb artifact may employ in-painting techniques to correct pixels within the orb edge feature.

One or more processor-readable media having program code embodied therein for programming one or more processors to perform a method of correcting a flash image orb artifact arising from specular reflections from airborne particles in accordance with any of the methods described herein.

BRIEF DESCRIPTION OF THE DRAWINGS

FIG. 6A illustrates rain orbs resulting from specular reflections from rain particles in the air with the camera zoomed in.
FIG. 6B shows rain orbs appearing in a flash photograph resulting from specular reflections from rain particles in the air with the camera zoomed in.
FIGS. 9A, 10A, 11A, 12A and 13A illustrate various orbs each including edge and interior regions.
FIGS. 9B, 10B, 11B, 12B and 13B shows various orbs each including edge and interior regions and appearing in flash photographs.
FIG. 14A illustrates a crop containing an orb.
FIG. 14B shows a crop containing an orb in a flash photograph.
FIG. 15A illustrates a corresponding polar transformation for the valid area of the orb of FIG. 14A.
FIG. 15B shows a corresponding polar transformation for the valid area of the orb shown in FIG. 15A.

DETAILED DESCRIPTION OF THE EMBODIMENTS

Figure 1A:
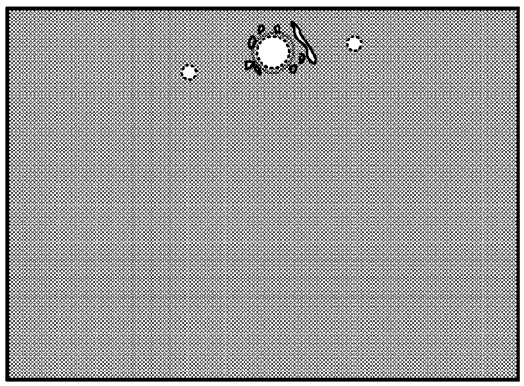
FIG. 1A illustrates a dust orb.

The techniques described below may be sub-divided into two main elements. The first includes detection of the flash image artifacts and the second is correction of the artifacts.

Detection: Introduction

As indicated in the Background section, the artifacts appear in the digital images taken with flash. The artifacts are generally semi-transparent and have an overall shape that is approximately round and encompassed by a somewhat brighter outer edge. Within the artifact area the original content of the image is shaded, as the "orbs" inside are matted and slightly textured. FIGS. 9A, 10A, 11A, 12A and 13A illustrate various orbs each including edge and interior regions. FIGS. 9B, 10B, 11B, 12B and 13B show various orbs each including edge and interior regions and appearing in flash photographs.

An approach according to one embodiment for detecting these airborne (or waterborne) artifacts that are typically due to reflection of flashes from dust or water vapor preferably includes one or both of the following. A first approach involves extraction of the edges from the image luminance components and a search for circular frontiers. The second approach, which may be performed by itself or in combination with the first approach, involves thresholding of the color image in the luminance and saturation domains, and selecting regions that are relatively bright and slightly unsaturated. The computation of local contrast (within the luminance component) may optionally also be used.

Correction: Introduction

The correction of the artifacts is preferably divided into two areas of the artifact. The first is the inside or interior region, and the second is the bright edge of the artifact. The inside of the artifact region may be corrected by decreasing the luminance and/or local contrast, and/or slightly increasing color saturation. The edges of the artifact region should be discarded from the image and replaced with corrected pixel values. A technique such as is described at U.S. Pat. No. 7,206,461 may be used. The '461 patent describes techniques for eliminating dust artifacts generally gathered on optics and/or a detector component, such as a CCD, of the camera.

The reflection of flash from dust particles creates in the digital image annoying artifacts that usually appear as circular patterns with bright outer edges and matted, slightly textured filling overlapping the correct image content. Illustrations of such artifacts are provided at FIGS. 9A, 10A, 11A and 12A, while flash photographs includes artifacts are shown at FIGS. 9B, 10B, 11B and 12B. Embodiments described herein advantageously remove those artifacts. Various approaches may be used including customizations which may differ according to the flash power of a specific camera and/or according to the type of flash reflecting particle, i.e., dust, pollen, paper crumples, etc.

The detection and the correction can both be performed in the camera or in a separate device like a PC. The process can be broken into two including detection in the camera and correction outside. The process can be fully automated (D&C), semi-automated (D-Auto then ask the user for confirmation then C-Auto) or manual (e.g., the user clicks on the Orbs and the SW then corrects them). The methods described herein may also be used for underwater photography. However, in the case of underwater photography, the orbs are not as rounded generally as when they are caused by airborne particulates. This is because there is a faster drop-off of light due to the refraction index of the water, such that the light is attenuated more rapidly than in air.

Interactive Detection of Circular Patterns in Digital Images

A method for orb detection in accordance with certain embodiments may include the following. The orb is cropped from an image, and further processing if performed on the crop rather than the entire image. The crop center is preferably as close to the orb center as possible. It is preferably to maintain a certain distance between orb margins and the crop margins. For example, the orb diameter is preferably at least half of any crop dimension from one edge to another.

The crop may be advantageously transformed to polar coordinates. The center of the Cartesian coordinate version may be used at the crop center. The transformation is done only for the valid region of the crop, and more particularly for the circular region which corresponds to the largest circle that can fit within the crop, which has been earlier selected to be larger than the orb diameter and contains the entire orb therein. Where a partial orb is detected in a photograph, it may be corrected by extrapolation.

The crop dimension is preferably taken into account for obtaining a proper radial and angular resolution in the polar coordinates. The radial resolution corresponds to the radius (r) of the transformed area while the angular resolution may be calculated using the relation:

$$N_\varphi = \text{round}\left(\frac{2\pi}{\arctan\left(\frac{1}{r}\right)}\right).$$

If the orb center coincides with the crop center and the orb has a circular or almost circular shape, then the orb margins will correspond to a line in polar coordinates as illustrated at FIGS. 14A-15B. FIG. 14A illustrates a crop containing an orb in Cartesian coordinates, or as photographed before any transformation of the image data. FIG. 14B is a flash photograph showing an actual same crop containing the orb. FIG. 15A illustrates a corresponding polar transformation for the valid area of the orb of FIG. 14A. FIG. 15B shows a corresponding polar transformation for the valid area of the orb shown in FIG. 15A. The linear "bottom" of the illustration of FIGS. 15A-B corresponds to the outer diameter of the circular orb illustrated at FIGS. 14A-B. The line just above and parallel to the linear bottom of FIG. 15A-B corresponds to the circular orb detection overlay shown in FIGS. 14A-B. The linear "top" of the illustration of FIGS. 15A-B corresponds to the center of the circular orb illustrated at FIGS. 14A-B.

Figure 16A:
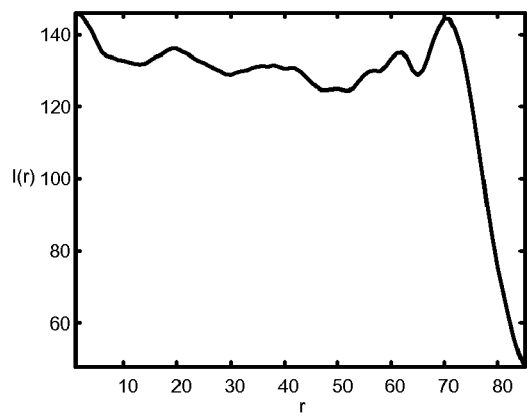
FIG. 16A shows a plot of luminance as a function of radius from the center of the orb of FIGS. 14A-15B, including the mean luminance calculated along an angular (horizontal) direction.

Even though the represented images are color, the detection method may be configured to consider only the luminance (gray level) values of the crops. Color is considered in another embodiment described below. In this case, since the orbs are typically brighter than the background, a decreasing transition is luminance values is observed when the mentioned detection line is crossed in the radial direction, i.e., outward from the center of the circle provided in FIGS. 14A-B and upward in the direction of the coordinate "r" in FIGS. 15A-B. This property holds for the luminance mean I(r) of the polar image illustrated in FIGS. 15A-B. The plot illustrated at FIG. 16A of the luminance mean was computed along the angular direction of FIGS. 14A-B (or the horizontal direction of FIGS. 15A-B) according to the relation:

$$I(r) = \frac{1}{N_\varphi} \sum_{\varphi=1}^{N_\varphi} O(r, \varphi).$$

Figure 16B:
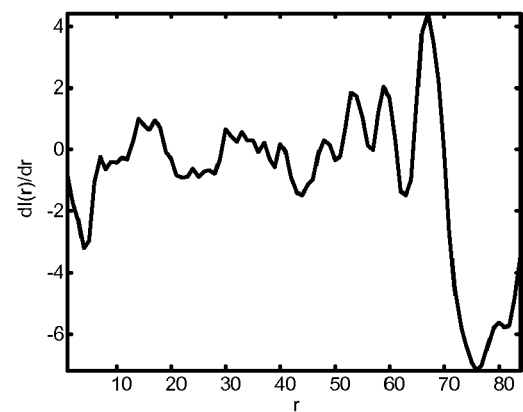
FIG. 16B shows a plot of the derivative of the luminance plotted at FIG. 16A also as a function of radius.

The above property still holds for relatively small deviations from circular shape and/or between crop center and orb center. Thus, taking the derivative of I(r), the orb margins can be estimated as being positioned at a radius which corresponds to a negative extreme of this derivative as depicted in the plot of FIG. 16B. When finding the derivative minimum, it can be taken into account the fact that orbs from a current database may have certain radii, e.g., between 9 and 180 pixels (according to the markings), and thus some values can be ignored.

If the images are considered to be continuous, the derivative $D_I$ of the mean I(r) can be calculated using one or the other of the following two relations:

$$D_I(r) = \frac{d\left(\frac{1}{2\pi}\int_0^{2\pi} O(r, \varphi)d\varphi\right)}{dr}$$

$$D_I(r) = \frac{1}{2\pi}\int_0^{2\pi} D_r(r, \varphi)d\varphi;$$

$$D_r(r, \varphi) = \frac{dO(r, \varphi)}{dr}.$$

Figure 17A:
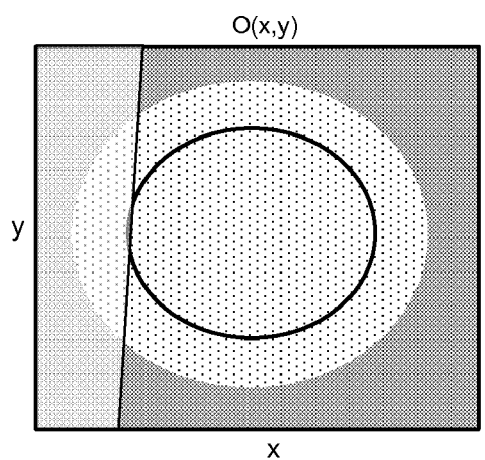
FIG. 17A illustrates an incorrect orb detection caused by a large local gradient.
Figure 17B:
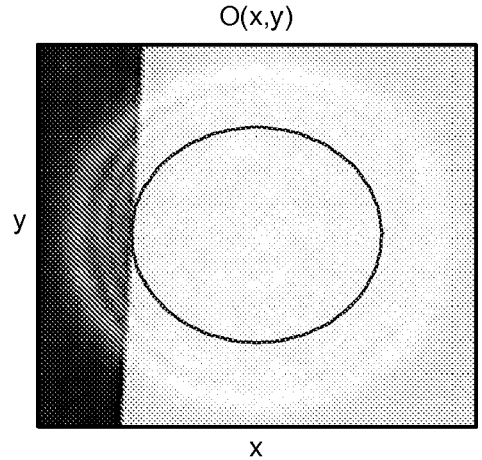
FIG. 17B shows an orb appearing in a flash photograph along with an incorrect orb detection caused by a large local gradient.
Figure 18A:
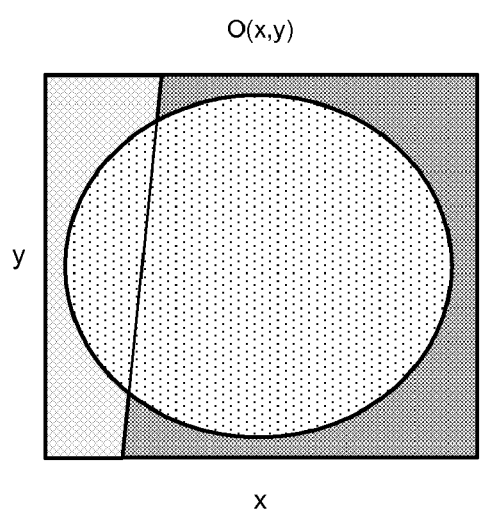
FIG. 18A illustrates a correct orb detection for the orb also illustrated at FIG. 17A.
Figure 18B:
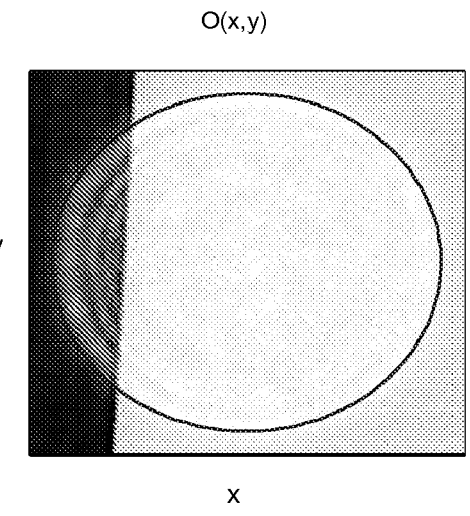
FIG. 18B shows an orb appearing in a flash photograph along with an correct orb detection notwithstanding the large local gradient which is overlayed by the orb.
Figure 17C:
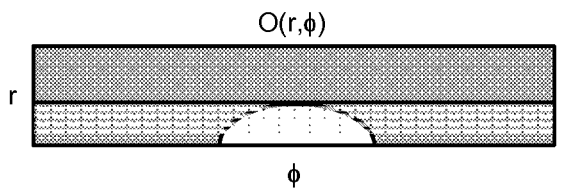
FIG. 17C illustrates a polar coordinate transform of the incorrect orb detection of FIG. 17A.
Figure 17D:
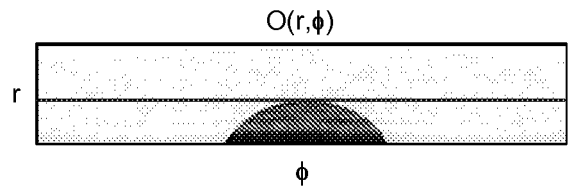
FIG. 17D shows a polar coordinate transform of the actual incorrect orb detection of FIG. 17B.
Figure 18C:
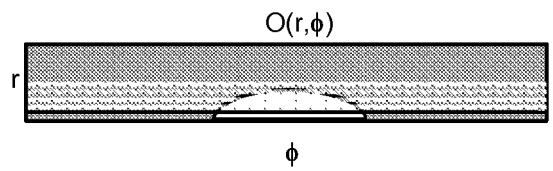
FIG. 18C illustrates a polar coordinate transform of the correct orb detection of FIG. 18A.
Figure 18D:
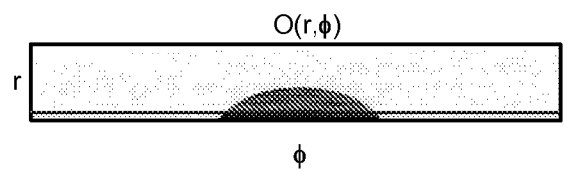
FIG. 18D shows a polar coordinate transform of the actual correct orb detection of FIG. 18B.
Figure 19A:
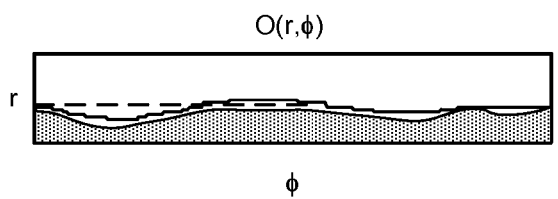
FIGS. 19A, 20A, 21A, 22A, 23A and 24A illustrate correct orb segmentations using means of the derivatives along the radial direction calculated locally, where 19A, 21A and 23A are polar coordinate transformations of the orbs illustrated at 20A, 22A and 24A.
Figure 19B:
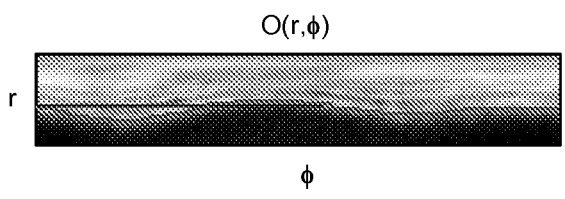
FIGS. 19B, 20B, 21B, 22B, 23B and 24B show correct orb segmentations overlaying orbs appearing in flash photographs using means of the derivatives along the radial direction calculated locally, where 19B, 21B and 23B are polar coordinate transformations of the orbs shown at 20B, 22B and 24B.
Figure 21A:
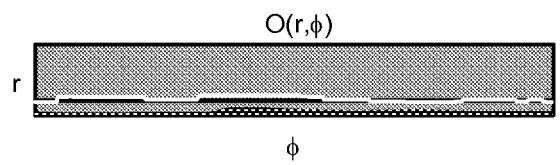
Figure 21B:
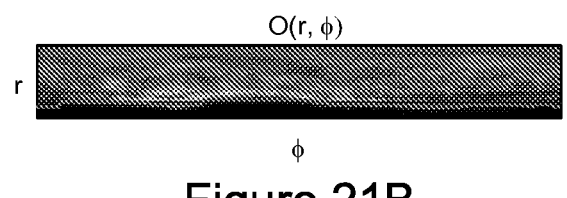
Figure 23A:
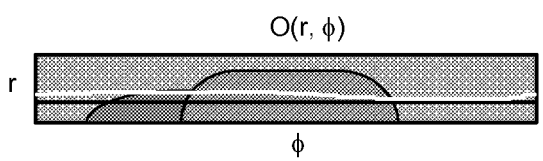
Figure 23B:
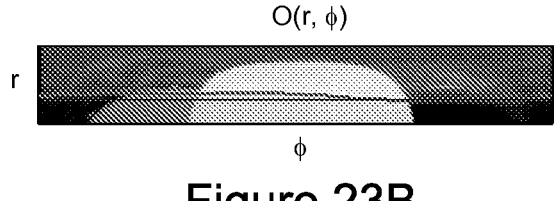
Figure 20A:
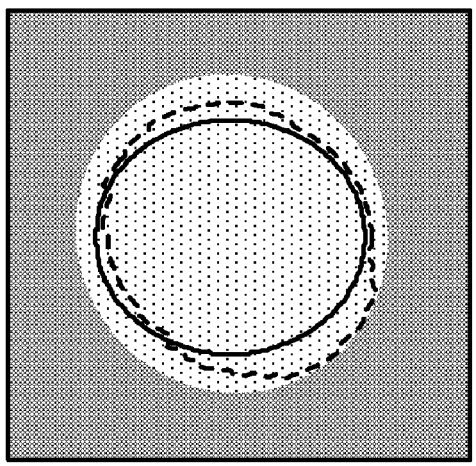
Figure 20B:
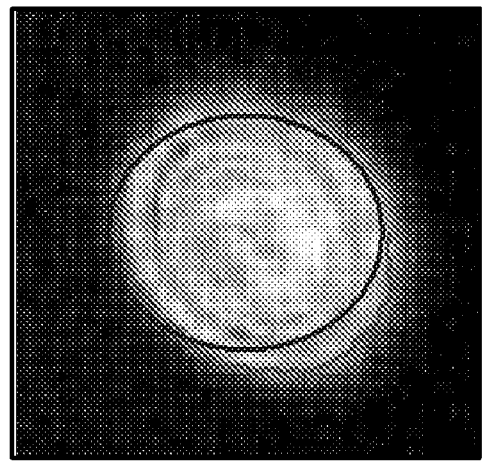
Figure 22A:
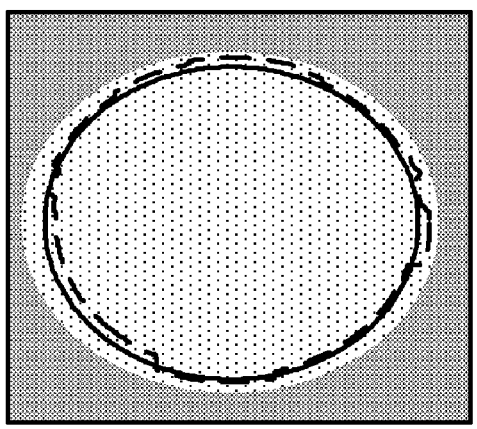
Figure 22B:
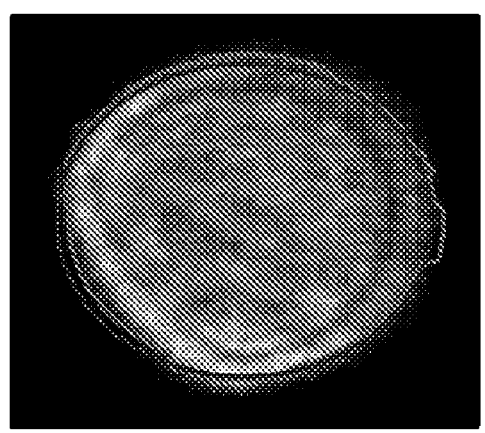
Figure 24A:
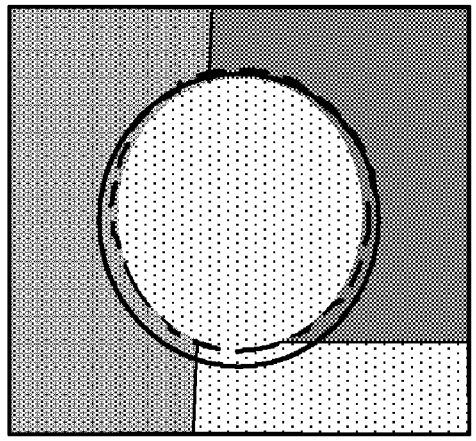
Figure 24B:
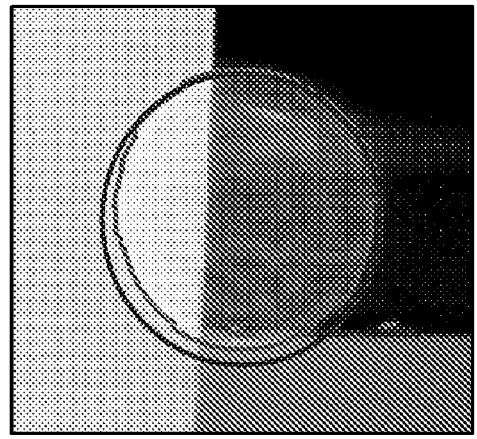
Figure 25A:
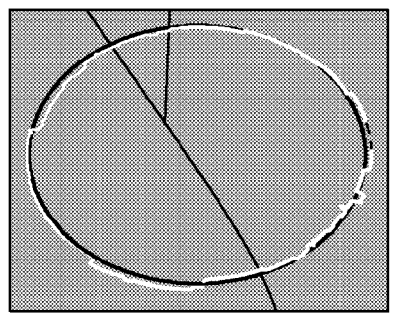
FIGS. 25A, 26A, 27A, and 28A illustrate orb segmentation resulting from using the sign of the luminance derivative.
Figure 25B:
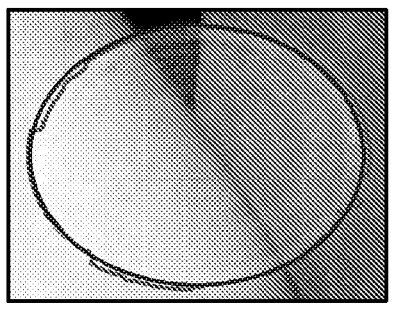
FIGS. 25B, 26B, 27B, and 28B show orb segmentation resulting from using the sign of the luminance derivative for orbs appearing in flash photographs.
Figure 29A:
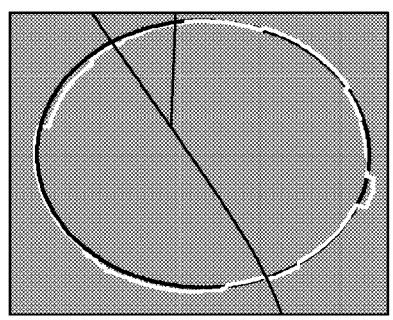
FIGS. 29A, 30A, 31A, and 32A illustrate orb segmentation resulting from using the luminance derivative.
Figure 29B:
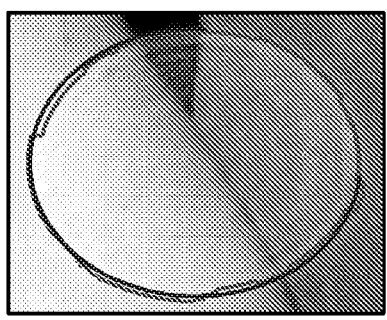
FIGS. 29B, 30B, 31B, and 32B illustrate orb segmentation resulting from using the luminance derivative for orbs appearing in flash photographs.
Figure 26A:
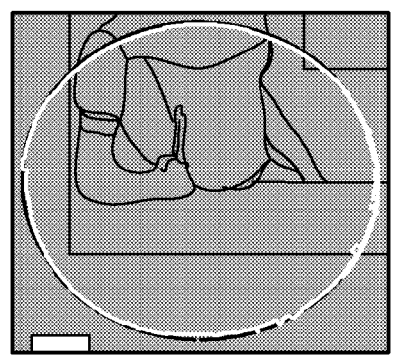
Figure 26B:
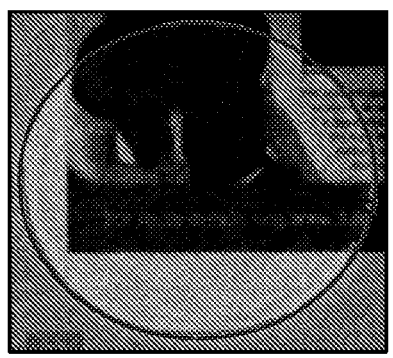
Figure 30A:
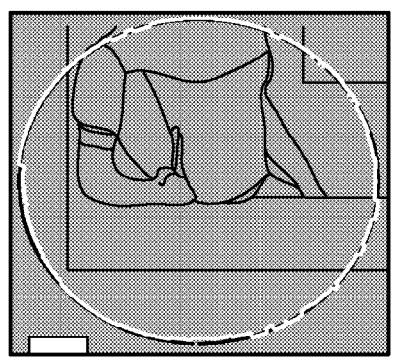
Figure 30B:
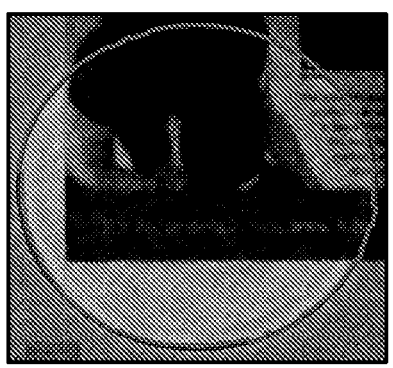
Figure 27A:
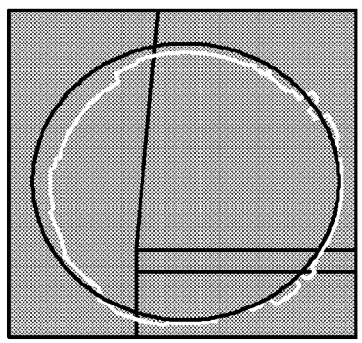
Figure 27B:
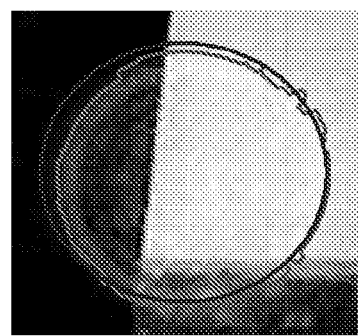
Figure 31A:
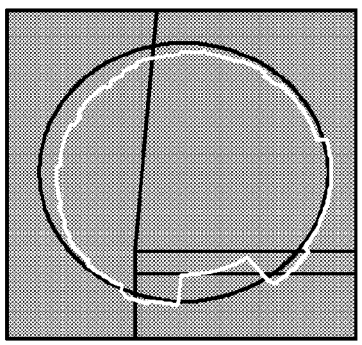
Figure 31B:
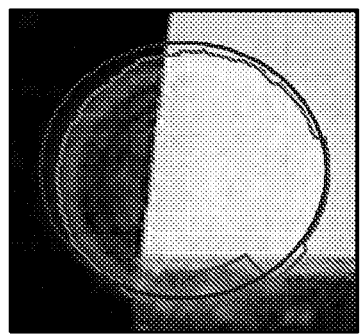
Figure 28A:
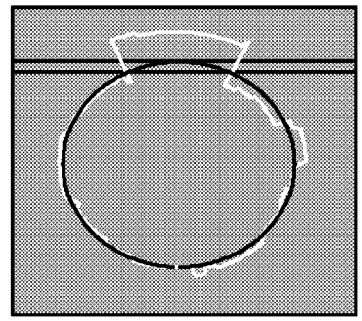
Figure 28B:
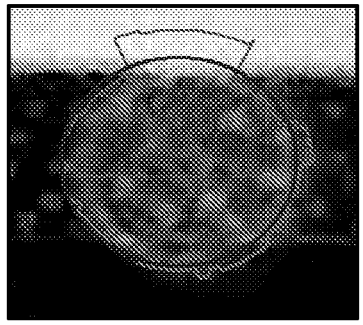
Figure 32A:
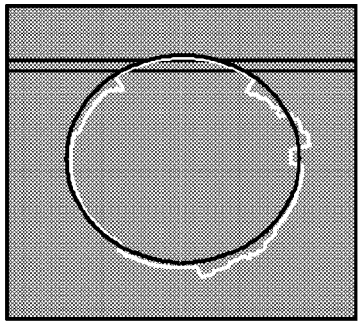
Figure 32B:
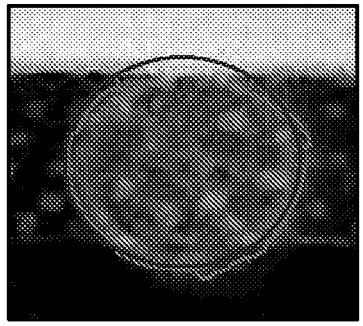

The first relation is more efficient with regard to the number of operations. Using the second relation makes it possible to discard some negative local gradients which are smaller than a specified threshold. Since the transition to the orb exterior is relatively smooth, it is possible to eliminate the negative influence of some stronger gradients on the orb detection which may appear when the orb is transparent. Such a case is illustrated at FIGS. 17A-18D. FIG. 17A illustrates an incorrect orb detection caused by a large local gradient, while FIG. 17B shows an actual orb appearing in a flash photograph along with the incorrect orb detection caused by the large local gradient. FIG. 17C illustrates a polar coordinate transform of the incorrect orb detection of FIG. 17A, while FIG. 17D shows a polar coordinate transform of the actual incorrect orb detection of FIG. 17B. FIG. 18A illustrates a correct orb detection for the orb illustrated at FIG. 17A, and FIG. 18B shows the orb appearing in a flash photograph along with the correct orb detection notwithstanding the large local gradient which is overlayed by the orb. FIG. 18C illustrates a polar coordinate transform of the correct orb detection of FIG. 18A, while FIG. 18D shows a polar coordinate transform of the actual correct orb detection of FIG. 18B. By setting some local gradients which are less than −15 to 0, and calculating the mean along the radial direction afterwards, it is possible to find the correct orb margins.

For a better orb segmentation, e.g., in cases where the orbs have some deviations from a circular shape, or when there is a substantial difference between the orb center and the crop center, it is possible to use the above techniques for performing a rough orb segmentation. Thus, the found line which corresponds to the negative minima of the mean along the radial direction of the derivative $D_r(r,\phi)$ will approximately fit the orb margins. By applying a moving average filter (MAF) on the $D_r(r,\phi)$, it is possible to detect more accurately the orb margins by finding the local minima's of the result in the neighborhood of the detected line as illustrated at FIGS. 19A-24B. FIGS. 19A, 20A, 21A, 22A, 23A and 24A illustrate correct orb segmentations using means of the derivatives along the radial direction calculated locally, where 19A, 21A and 23A are polar coordinate transformations of the orbs illustrated at 20A, 22A and 24A. FIGS. 19B, 20B, 21B, 22B, 23B and 24B show correct orb segmentations overlaying orbs appearing in flash photographs using means of the derivatives along the radial direction calculated locally, where 19B, 21B and 23B are polar coordinate transformations of the orbs shown at 20B, 22B and 24B. The MAF has the dimension of $(3 \times N_\phi/10)$ and the circular convolution with $D_r(r,\phi)$ is equivalent to calculating the $D_I(r)$ locally. In FIGS. 25A-32B, the detected orb contour is delimited with red color and the line and its corresponding circle which best fit to the orb contour are blue.

The orb segmentation is not preferably performed by using only the local derivatives of the polar image, because the transitions to the exterior of the orb do not take extreme values. Summing this image along the angular direction will cumulate the negative gradients corresponding to the orb margins if the orb is almost circular and its center is close to the center of the image in the Cartesian coordinates. Thus, this accumulation will lead to an absolute minimum which will coincide with the orb margins if the deviations from a circular shape are not too large. This can help for detecting transparent and low contrast orbs which otherwise are difficult to detect.

Similar results can be obtained as above if in the described algorithm the sign of $D_r(r,\phi)$ is used. The segmentation results are presented in FIGS. 25A-32B, where $sgn(D_r(r,\phi))$ is used and compared to the results obtained when $D_r(r,\phi)$ was used. That is, FIGS. 25A, 26A, 27A, and 28A illustrate orb segmentation resulting from using the sign of the luminance derivative. FIGS. 25B, 26B, 27B, and 28B show orb segmentation resulting from using the sign of the luminance derivative for orbs appearing in flash photographs. FIGS. 29A, 30A, 31A, and 32A illustrate orb segmentation resulting from using the luminance derivative. FIGS. 29B, 30B, 31B, and 32B illustrate orb segmentation resulting from using the luminance derivative for orbs appearing in flash photographs.

This detection method was tested on two databases as follows. The first database used contained 327 orb crops, which were cropped by using the markings, and thus there was a relatively good coincidence between orb center and crop center. The performances of correct detection were evaluated visually in a subjective manner. It was found that for only 10 images the detection of orb contours completely failed and in 5 of these 10 cases the images were containing partial orbs (that are cut by the image sides). The second database used contained 770 orb crops, which were cropped manually in such manner that the orbs had a central position in the images. Using the detection algorithm, it was found that only 32 orbs were incorrectly segmented. If inherent errors of the subjective performance assessment are disregarded, it can be stated that the correct detection rate is 97% for the first database and 95.8% for the second database.

It is recognized with regard to the technique just described that the detected areas may be dilated in order to completely cover the orb. Also, for improving a detection accuracy, the orb may be positioned as central as possible in the cropped area.

It is also recognized the techniques described above and below are advantageous for detecting transparent and/or low contrast orbs regardless of background content. The method can be equally used to detect other circular shapes, particularly those requiring correction (and not only orbs).

Figure 33A:
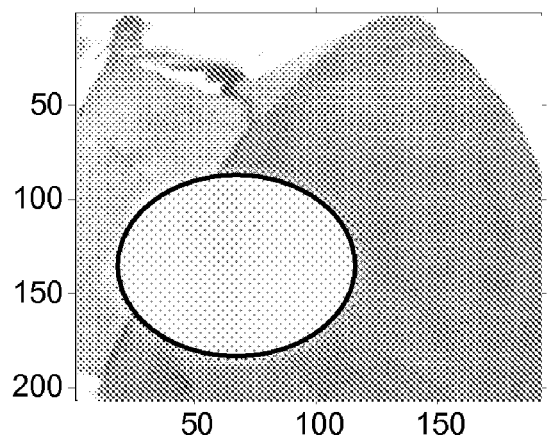
FIG. 33A illustrates an image crop containing an orb.
Figure 33B:
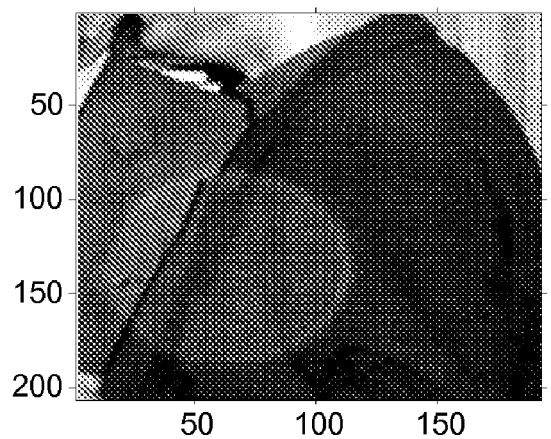
FIG. 33B shows an image crop containing an orb taken from a larger flash photograph.
Figure 34C:
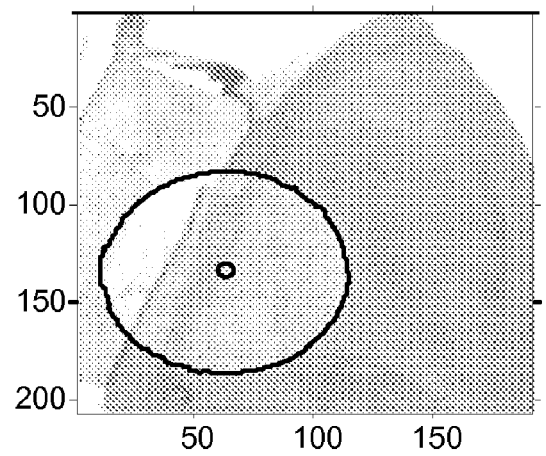
FIGS. 34C-D illustrate and show an image crop containing an orb taken from a larger flash photograph and including identified center and edge regions.
Figure 34D:
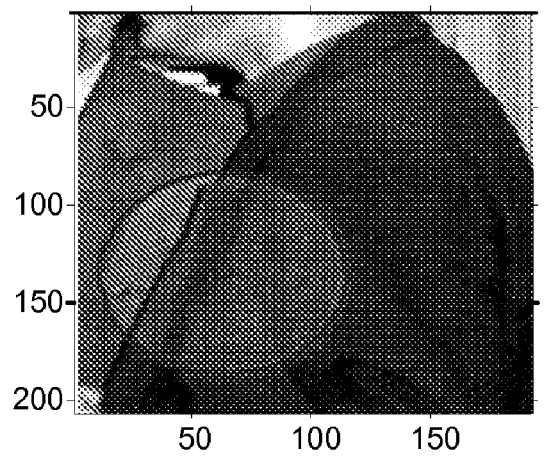
Figure 34A:
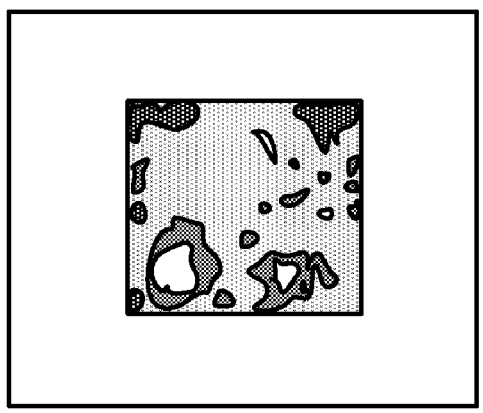
FIG. 34A-B illustrate a confidence map calculated for the crop of FIGS. 33A-33B and the detected orb center and boundary edge, including an illustration and color schematic, respectively.
Figure 34B:
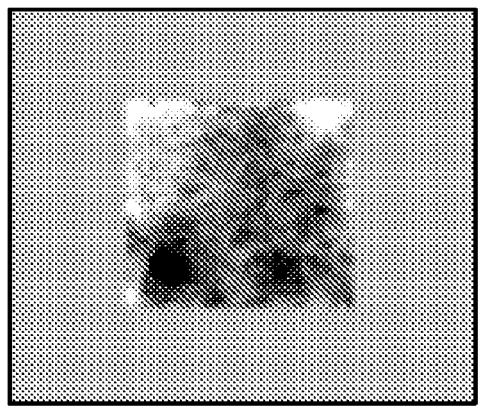

Interactive Detection of the Center of Approximately Circular Patterns (e.g., Orbs) in Digital Images The following deals more specifically with orb center detection and orb boundary detection and can be used for center detection of circular patterns with similar properties. The orb center is searched in an image crop when it is assumed that the orb is completely contained in the cropped area. For reducing the searching area and improving the detection accuracy, certain conditions may be imposed on the crop size with respect to orb size. For example, the orb diameter may be maintained as not smaller than half of the minimum between crop sides. An example of such crop is presented in FIGS. 33A-B respectively as an illustration and an actual flash photograph. These conditions can be very helpful in searching the orb center in a limited central region within the crop which takes account of a smallest assumed orb diameter.

Each point $[x_0, y_0]$ of the searching area within the crop is considered the center of the Cartesian Coordinates. A Polar Coordinate Transform (PCT) on the luminance component of the crop is performed for the pixels within the crop, and preferably only for the valid region of the crop. It is more exactly for the circular region which corresponds to the largest circle having the center at $[x_0, y_0]$ that can fit within the crop. Assuming that the image $O(x,y)$ is of continuous variables, its transformation in polar coordinates may be denoted by $O(r,\phi)$ and is determined by replacing the variables $x=r\cos\phi$ and $y=r\sin\phi$.

Denoting with $\text{sgn}(D_r(r,\phi))$ the sign of the derivative along the radial direction $$D_r(r, \varphi) = \frac{dO(r, \varphi)}{dr},$$

a confidence measure is calculated for each point of the searching area of the crop. This confidence measure $M(x,y)$ is calculated using the following relations:

$$S(r) = \frac{1}{2\pi} \int_0^{2\pi} \text{sgn}(D_r(r, \varphi)) d\varphi$$

$$M(x, y) = \min(S(r)) \in [-1, 1], r \in [r_{min}, r_{max}]$$

The minimum value of $S(r)$ is calculated for a restricted interval of radial variable which takes account of minimum and maximum imposed orb size with respect to the crop size. Thus, if the center of the Cartesian Coordinates $[x_0, y_0]$ coincides with the orb center then $S(r)=-1$ for a radial value equal to the orb radius if the orb is perfectly circular and will be close to $-1$ if it will have an almost circular shape.

Figure 35A:
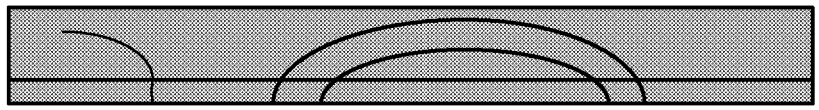
FIG. 35A illustrates a polar transformation for a valid area calculated in the detected center of the orb of FIGS. 33A-33B and 34.
Figure 35B:
FIG. 35B shows a polar transformation for a valid area calculated in the detected center of the orb appearing in a flash photograph and also illustrated at FIGS. 33A-33B and 34.
Figure 36:
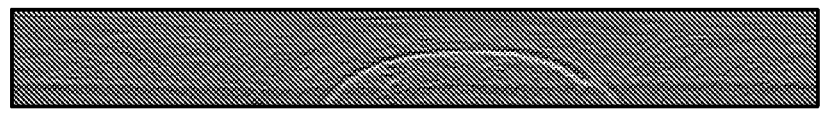
FIG. 36 illustrates the luminance derivative corresponding to the flash photograph of FIG. 35B which is also illustrated at FIG. 35A.
Figure 37:
FIG. 37 illustrates the sign of the luminance derivative illustrated at FIG. 36.

Having the confidence map for each pixel within the central area within the crop, the orb center can be considered the pixel with the minimum confidence value. The orb detection may be performed using polar coordinate transform in the cropped area. FIGS. 35A-B illustrate the polar transform for a valid area calculated in the detected center of an orb, wherein FIG. 35B is the polar transform of an actual flash photograph. FIG. 36 is a depiction of the derivative of the polar transform of the orb of FIGS. 35A-B. FIG. 37 is a depiction of the sign of the derivative of the polar transform of the orb of FIGS. 35A-B.

The above relations must be adapted for the practical case when the image is a function of discrete variables. Thus, the resolution in the polar coordinates must take account of the crop dimension, and, since practically the PCT means a non-uniform re-sampling and reordering, a proper radial resolution may be half of the size of valid area and angular resolution may be chosen accordingly to following relation:

$$N_\varphi = \text{round}\left(\frac{2\pi}{\arctan\left(\frac{1}{r}\right)}\right)$$

Since this method is very computational expensive and the orbs may have radial values confined to [10, 180] interval, the crop size may be advantageously reduced by sub-sampling maintaining its minimum side under 100 pixels. Also, reducing the angular resolution under the above limit and calculating the above relations for a reduced interval of radial values can advantageously reduce the computational time from several minutes to seconds.

The technique may not perform optimally in detecting the orb center at full resolution when the crop contains high frequency patterns or noise, thus it can be advantageous to smooth the cropped image. Thus, median filtering is performed according to certain embodiments. Reducing the resolution can improve detection, for example, prior to sub-sampling, a low-pass filter may be applied.

Even if the just-described method does not perform optimally when the orb has a shape very different from a circular one or when the background is too complex, it will generally still give good results in detection of the orb center. The experimental results made on a set of 2264 of cropped images containing orbs showed that the implemented algorithm had a detection rate of orb centers of 90%. Different distances from orb margins and crop sides were taken corresponding to orb radii and then this distance was halved.

When an orb has an almost circular shape, it is possible to obtain a confidence value of $-1$ for more than one pixel which belong to the same neighborhood, and in this case the mean value of the pixel coordinates is considered to be the crop center.

The method may have relaxed conditions imposed on the crop for orb detection compared with the above described technique which uses a polar coordinate transform. More specifically for detecting the orb, the crop center need not be as close to the orb center. Therefore, a combination of the techniques described herein may be used, and a technique described herein may be combined with a technique described in one or more of the references cited herein.

Orb Detection with User Input

Figure 38:
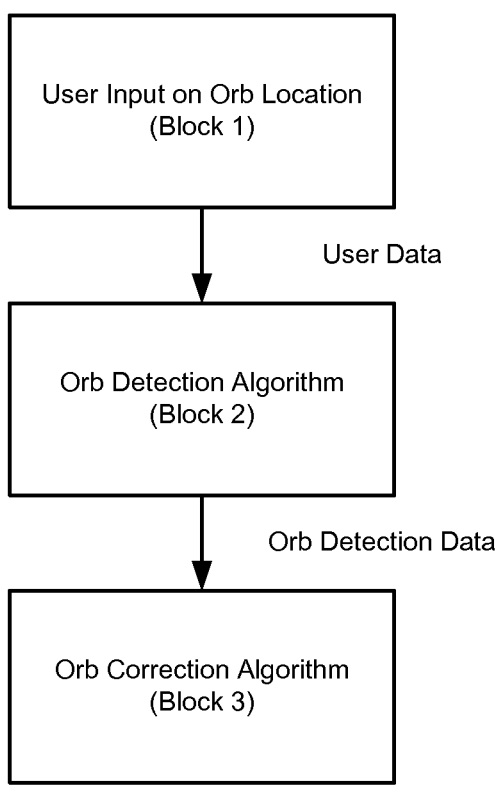
FIG. 38 is a block diagram illustrating a method of detecting and correcting orb artifacts appearing in flash photographs.

The method can be resumed as the detection and correction of digital image artifacts that appear in images acquired by compact digital still cameras due to the flash light reflection on dust/rain particles that are placed out of focus. Thus, a method according to certain embodiments may be characterized as a three-step procedure, as illustrated at FIG. 38. Block 1 that implements the user input on the desired area to be corrected, Block 2 that implements the detection procedure of the user-selected orb and Block 3 that implements the correction procedure of the detected orb. User input on orb location The user input is the starting point of the method. The user is required to mark the area within the image where the orb effect appears. The selection is performed in two ways: by the selection of a point within the orb (preferred) or by the selection of a rectangular region of interest containing the orb. In both cases, the selection is realized by some graphical user interface, using a mouse or a similar device.

The outcome of orb selection block is either a pixel coordinate (in the preferred case of point within the orb selection) or the upper left corner and the dimensions of the rectangular area of interest (in the case of rectangular orb selection). These data is passed as input (together with the original color image to be processed) to the orb detection block (Block 2).

Orb Detection: Further Embodiment

Figure 39:
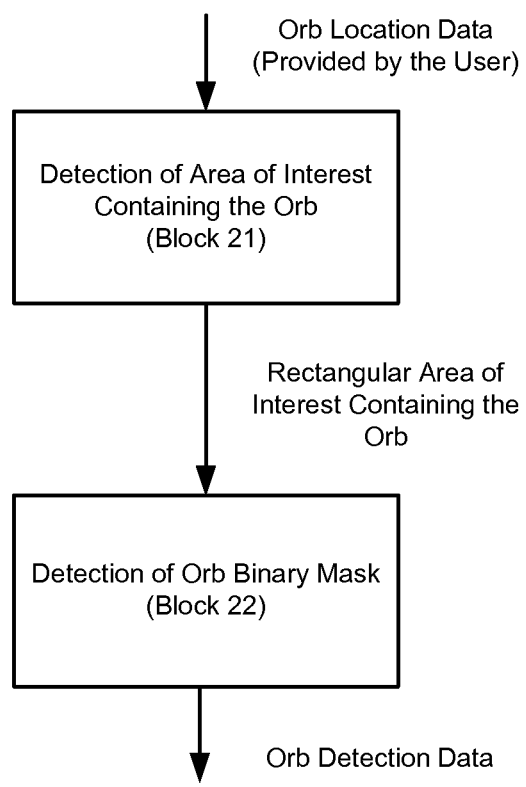
FIG. 39 is a block diagram illustrating orb detection in accordance with certain embodiments including orb area of interest detection and orb binary mask detection.

The orb detection algorithm can be decomposed into two parts, as illustrated in the flow diagram of FIG. 39. Block 21 that computes an rectangular area of interest containing the orb pointed by the user and Block 22 that computes the actual orb location. The input data used by the detection algorithm is the data provided by the user (as output of Block 1) and the luminance (gray scale) component of the original color image that is to be processed.

The final orb detection data consists of a rectangular area of interest, that encompasses the orb with a predefined 50 pixel border (if the orb is located at least 50 pixels from the corresponding image margin, otherwise, the border equals the distance to the corresponding image margin) and a binary mask (within the area of interest), exactly covering the orb.

Detecting Area of Interest Containing an Orb

Figure 40:
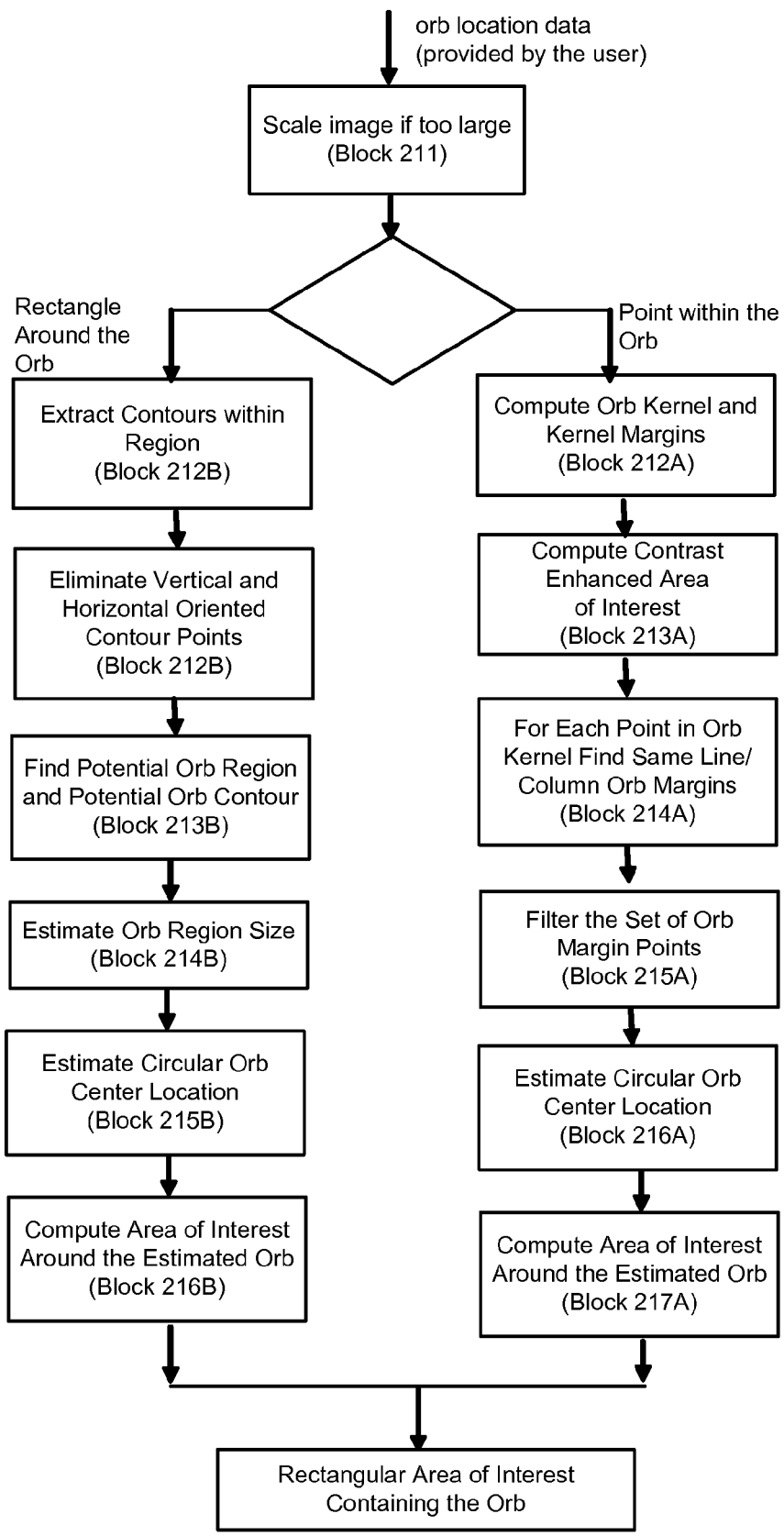
FIG. 40 is a block diagram illustrating orb area or interest detection in accordance with certain embodiments.

Detection of an area of interest containing an orb may be performed according to the flow diagram of FIG. 40. Block 211 performs a down-sampling of the original luminance component, such that the overall dimension of the image to be processed does not exceeds 1200000 pixels (the down-sampling factor is kept, such that the output detection result from Block 22 is re-scaled at the original image size). The down-sampling is followed by two execution thread: thread A for point within orb user selection and thread B for rectangle around orb user selection.

Computing Orb Kernel and Kernel Margins

For points within an orb user selection, orb kernel and kernel margins are preferably computed. The orb kernel is defined as a connected component, containing the user-selected point, exhibiting a uniform visual appearance. The visual appearance is measured by the local average luminance and the local luminance contrast (range to average ratio).

First, a rectangular area is cropped from the luminance component of the entire image; the crop area is 10 pixels wide at each side of the user-selected pixel (if the user selected pixel is far enough from the image margins).

The cropped area is preferably thresholded following a set of three conditions:
1 average luminance within a 5×5 window should be similar to the average luminance around the user selected pixel (absolute difference below 10);
2 local contrast within a 5×5 window should be similar to the local contrast around the user selected pixel (absolute difference below 0.1); and
3 local contrast within a 5×5 window should be below 0.5 (in order to avoid contour points).

The resulting binary image is labeled and the connected component containing the user-selected point is kept. If no connected component results after thresholding, only the user-selected point is kept. If connected components exist, but the user selected points is on background, the nearest connected component is kept and the user-selected point is added.

The kernel margins are the kernel pixels from the previously extracted connected component that have at least one neighbor on the background. The implementation uses function "orb_local_char" to compute local characteristics around the user-selected point.

Computing Contrast-Enhanced Area of Interest

A contrast-enhanced area of interest may be computed. In this embodiment, an area of interest is cropped from the original luminance image; the crop area is 100 pixels wide at each side of the user-selected pixel (if the user selected pixel is far enough from the image margins). This area of interest is contrast-enhanced by a modified histogram equalization technique. The implementation may use functions "totalhe" and "lexic".

Finding Line/Column Orb Margins

For each point within the orb kernel margin (or at least for the point selected by the user), along the corresponding line and column, the orb margins may be computed. Thus, it is obtained for each point in the kernel a pair of orb margins on the same line and a pair of orb margins on the same column. The center of the same line margins estimate the column location of the orb center point and the center of the same column margins estimate the line location of the orb center. Also, the distance from the orb center to the same line located orb margins and same column located orb margins are estimates for horizontal and vertical orb radiuses.

The procedure for the identification of orb margin along a given direction (either vertical or horizontal) may be as follows. The luminance values along the given direction are extracted from the image within a one-dimensional signal; the signal is smoothed by sequence of a median and averaging filters. The average luminance value ($\mu$) and the luminance dispersion ($\sigma$) are computed around the position of the initial point.

The smoothed signal is thresholded, selecting the values that are within 3 dispersion units ($3\sigma$) around the average luminance $\mu$. The resulting binary signal is labeled for connected segments and only the segment that contains the initial point is kept. To this binary segment from the signal one adds the neighboring slope intervals, if any (the slope intervals are defined as exhibiting more than twice the average absolute derivative value within the binary segment containing the initial point. Finally, the begin and end points locations of the binary segment are kept as margins of the orb along the given direction.

Filter Orb Margin Points

The set of orb margin points (and their associated orb center and orb radiuses information) may be filtered in order to eliminate the false margin points present. The filtering may involve the following. First, there may be performed an elimination of the orb margin points (vertical and horizontal pair, obtained for a same initial point within the orb kernel) that exhibit a high dissimilarity between the horizontal/vertical radiuses (maximal to minimal radius ratio more than 4). Next, multiple orb margins may be eliminated along the same line or same column by keeping the median locations for each left/right-side and up/down-side orb margins. Next, orb margin points may be eliminated that are highly eccentric with respect to the overall estimated orb center (the orb center is obtained as the center of the individual orb centers computed for each initial point within the kernel); the orb margin points exhibiting the top 20% and the lower 15% distances to the orb center are eliminated.

Estimating Circular Orb Center Location

For the remaining orb margin points obtained after the previous filtering procedure, the orb center and radiuses are estimated by a median estimator applied to the set of individual orb centers and radiuses.

Computing Area of Interest Around Estimated Orb

The area of interest around the orb is obtained as a rectangular area centered in the orb center computed above and with dimensions along the vertical and horizontal given by a 30% increase of the horizontal/vertical orb radiuses computed above.

A rectangle may be provided around an orb user selection. In order to extract the contours within selected region (as selected by the user or an automated program), contour points are extracted by a standard contour extraction method. The implementation uses the standard Canny edge extraction operator.

Vertical and horizontal oriented contour points are also eliminated. For each selected contour pixel the orientation of the corresponding contour is computed. The vertical/horizontal oriented contours (oriented within $\pm\pi/10$ with respect the horizontal and vertical) are eliminated, since they usually come from scene objects and not the actual orb.

The orb region size is estimated. The selected area is contrast-enhanced by a modified histogram equalization technique. This enhanced version of the luminance component is thresholded with a fixed threshold of 115. The resulting binary mask (which is subsequently morphologically smoothed by an open-close operator) is assumed to represent the orb region. Assuming that the region is circular, its radius (the size) can be estimated by an area equivalence method.

Estimating Circular Orb Center Location

The orb can be assumed or approximated to be circular. Under this assumption, a Hough transform may be used for the computation of its center. The simplifying assumption can be used that the size computed in Block 214B is an estimate of the orb radius.

The Hough transform is computed for circles using several fixed radiuses, spanning the interval from 0.9 to 1.1 the estimated orb radius. The accumulator planes of the Hough transform are added and smoothed by an averaging operator. In this smoothed accumulator plane we extract the local maxima (that are above 90% of the actual maximal value) and selected the most central located connected component. The center of that component is the actual orb center.

A new orb radius is estimated based on the best fit of a circle with given center within the orb area detected by Block 214B of FIG. 40.

Computing Area of Interest Around Estimated Orb

The area of interest around the orb may be obtained as a square area centered in the orb center computed above and with dimensions along the vertical and horizontal given by a 20% increase of the orb radius computed above.

Detection of Binary Orb Mask

Figure 41:
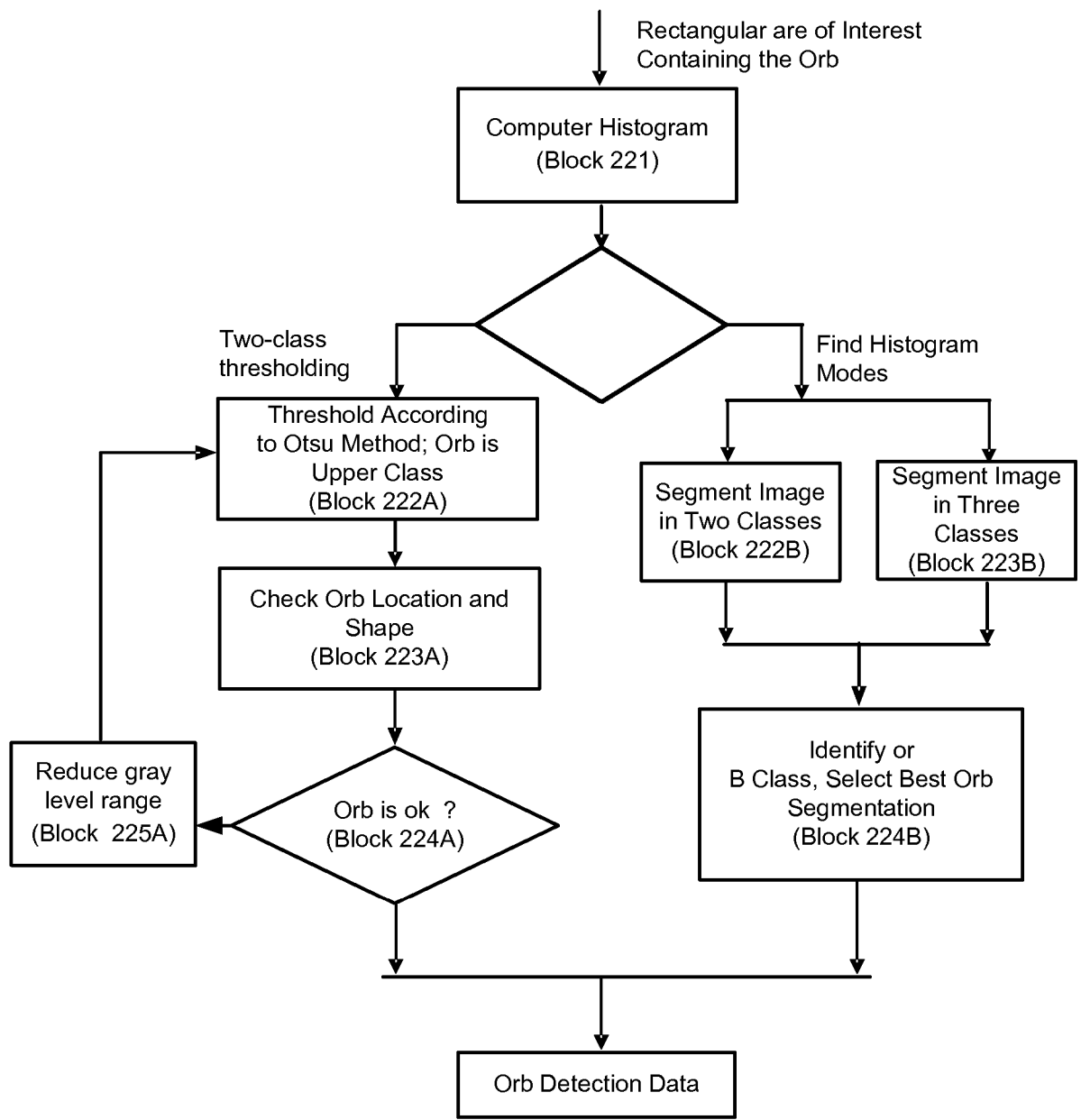
FIG. 41 is a block diagram illustrating orb binary mask detection in accordance with certain embodiments.

The detection of the actual (binary) orb mask within the area of interest containing the orb is performed according to the flow diagram of FIG. 41. Block 221 computes the gray level histogram within the given area of interest provided by the detection Block 21 of FIG. 39. The orb mask detection can follow two threads: thread A based on image binarization (two-class thresholding) or thread B based on histogram mode analysis.

The final orb detection data may include a rectangular area of interest that encompasses the orb with a predefined 50 pixel border (if the orb is located at least 50 pixels from the corresponding image margin, otherwise, the border equals the distance to the corresponding image margin) and a binary mask (within the area of interest), covering the orb preferably approximately exactly.

Computing Histogram within Area of Interest

The histogram of the area of interest containing the orb is computed for the gray level range (0-255). There are two possible processing threads: adaptive two-class thresholding (thread A) and histogram mode identification (thread B).

Two-Class Thresholding: Otsu Method

The underlying assumption is that the orb is lighter than the background (and any other light parts of the scene are not within the area of interest containing the orb, or, at least, the orb is not connected to any other light object). Then, the threshold is computed that separates the upper (light) mode from the histogram.

The Otsu adaptive technique is preferably used. This technique finds the optimal binarization threshold such that the sum of variances of the resulting two gray level ranges is minimal. The binary image is labeled and the connected component that contains the original point clicked by the user is selected as the binary orb mask.

Checking Orb Location and Shape

The binary orb mask (orb component) may be characterized by shape and location parameters. The location parameters measure the extent of orb-on-image margins occurrences (the ratio of orb points along each of the left, right, upper and lower area of interest margins). The shape parameters measure the roundness of the orb binary component (the ratio of maximal to minimal eigenvalues associated to the orb point coordinates).

A decision may be made whether the "orb is OK". If the orb is on any image margin for more than 20% of that margin, it is assumed that the orb is not well segmented. If the orb roundness ratio is above 4, it is assumed that the orb is not well segmented.

Gray Level Range Reduction

Figure 1B:
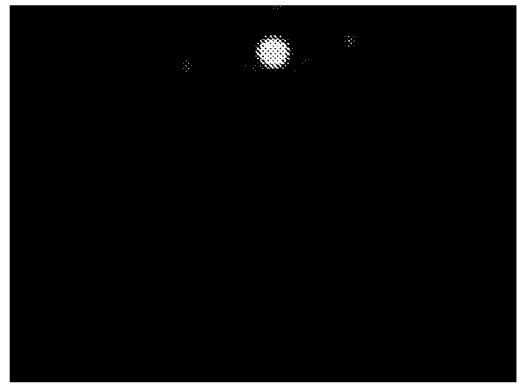
FIG. 1B shows a dust orb appearing in a flash photograph.
Figure 2A:
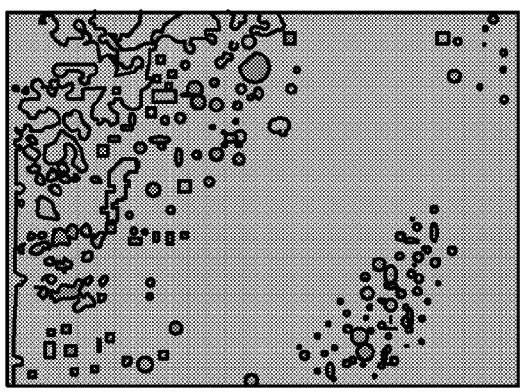
FIG. 2A illustrates multiple dust orbs.
Figure 2B:
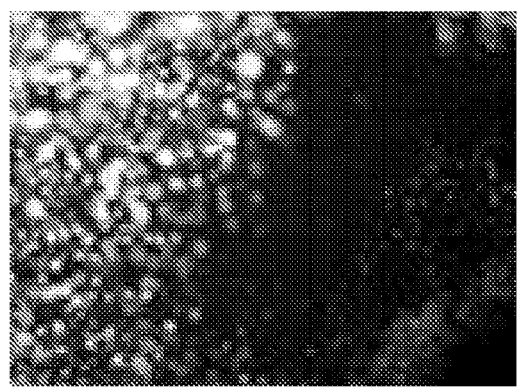
FIG. 2B shows multiple dust orbs appearing in a flash photograph.
Figure 3A:
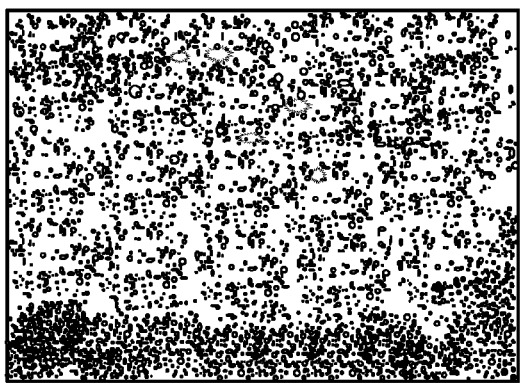
FIG. 3A illustrates orbs resulting from specular reflections from thick charcoal dust.
Figure 3B:
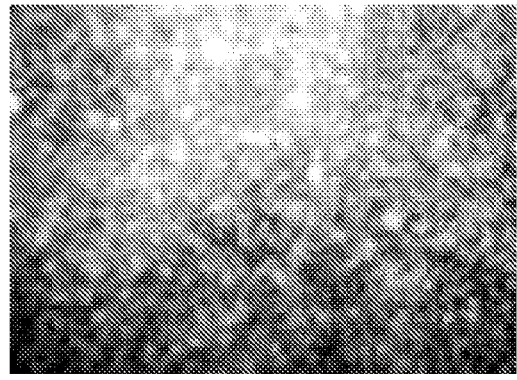
FIG. 3B shows orbs resulting from specular reflections from thick charcoal dust appearing in a flash photograph.
Figure 4A:
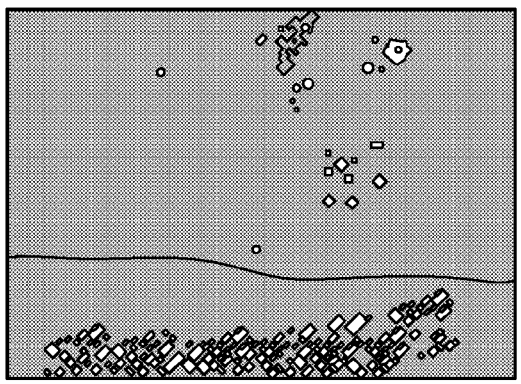
FIG. 4A illustrates orbs resulting from specular reflections from charcoal dust floating in the air.
Figure 4B:
FIG. 4B shows orbs appearing in a flash photograph resulting from specular reflections from charcoal dust floating in the air.
Figure 5A:
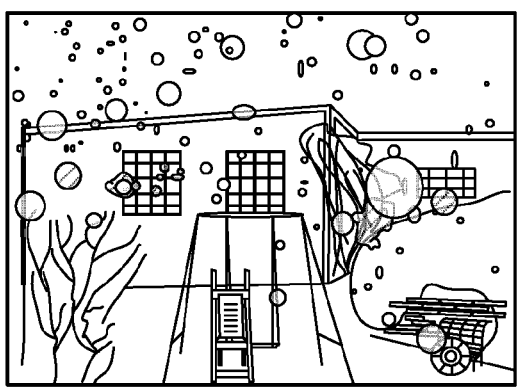
FIG. 5A illustrates rain orbs resulting from specular reflections from rain particles in the air with the camera zoomed out.
Figure 5B:
FIG. 5B shows rain orbs appearing in a flash photograph resulting from specular reflections from rain particles in the air with the camera zoomed out.
Figure 6A:
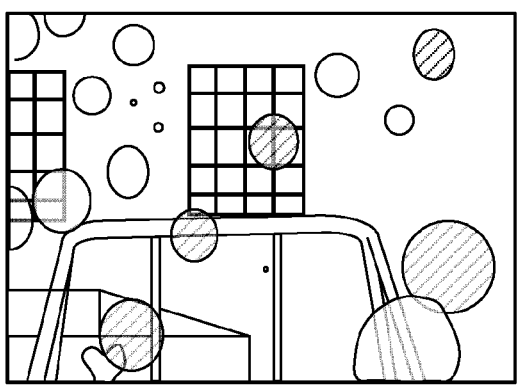
Figure 6B:
Figure 7A:
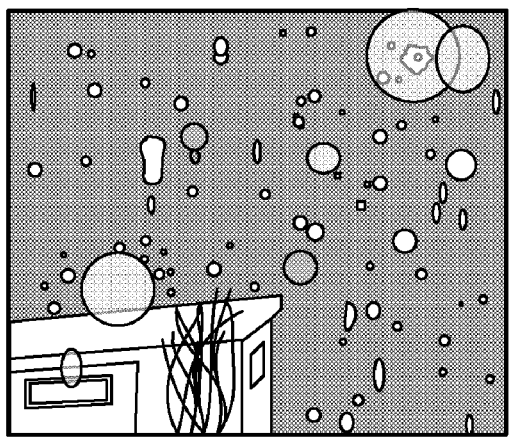
FIG. 7A illustrates rain orbs with coma (tails) and chromatic aberrations.
Figure 7B:
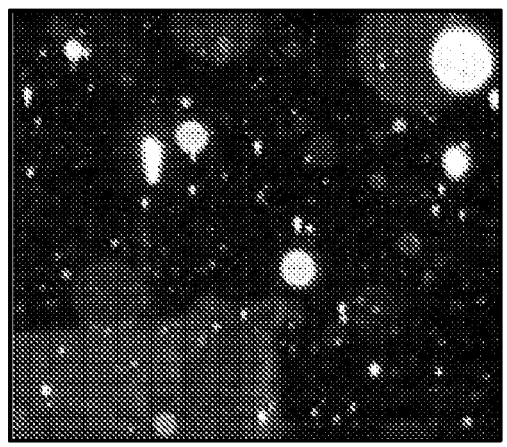
FIG. 7B shows rain orbs appearing in a flash photograph with coma (tails) and chromatic aberrations visible.
Figure 8A:
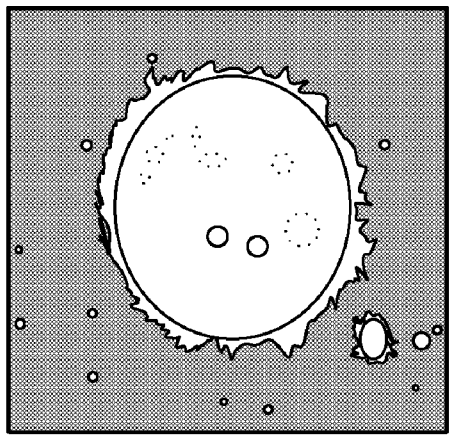
FIG. 8A illustrates a close-up of an orb, clearly showing chromatic aberration.
Figure 8B:
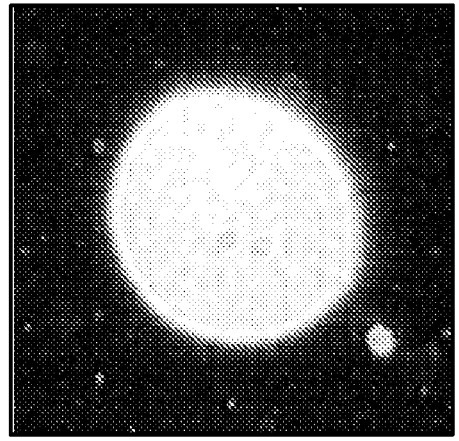
FIG. 8B shows a close-up of an orb in a flash photograph which shows chromatic aberration very clearly.
Figure 9A:
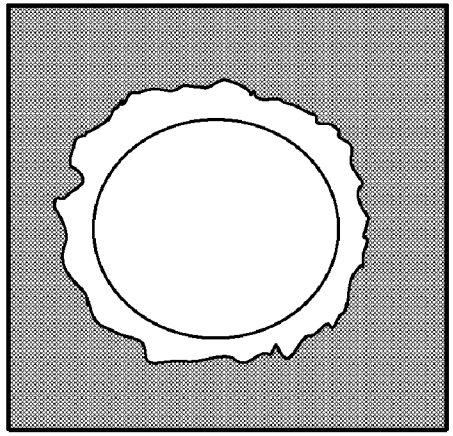
Figure 9B:
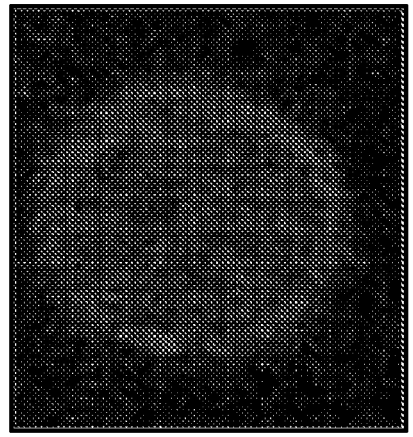

If the orb is not well segmented, the gray level range is re-estimated. Namely, the bad orb segmentation usually happens if there is light background within the considered area of interest. Thus, we select a gray level range reduced to the range from 0.9 of the minimal gray level value in the orb kernel computed in Block 212A of FIG. 40 to 1.1 of the maximal gray level value in the orb kernel computed in Block 212A. The histogram is re-computed within the new range and the binarization (Blocks 222A and 223A of FIG. 41) is performed once again. The test from Block 224A is not performed a second time (the second orb is assumed to be well segmented).

Histogram Mode Identification

Image segmentation may be provided in two classes. Using the gray level histogram computed in Block 221 of FIG. 41, threshold desired for a two-class segmentation of the area of interest using an EM (expectation-minimization) method is computed.

Image segmentation may be provided in three classes. Using the gray level histogram computed in Block 221, the thresholds desired for a three-class segmentation of the area of interest using an EM (expectation-minimization) method are computed (the same method as in Block 222B of FIG. 41).

Identification of Orb Class

In each of the segmented images yielded from Blocks 222B and 223B of FIG. 41, the class containing the orb is identified as the connected component that contains the click point selected by the user. Thus, we retrieve two possible binary orb masks, one from each of the segmentation blocks 222B and 223B.

The two orb masks are characterized following the same principles from Block 223A (orb location within the area of interest and orb roundness). The best orb is selected according to the principles set in Block 224A. The best orb is the most central-located and the most round, or best combination of these.

The techniques may use sub-routines that have been developed elsewhere and are public available on the Internet (e.g., EMSeg, houghcircle).

What follows is a list of built-in Matlab functions that may be used within an implementation of the above described techniques:

General functions
size, min, max, abs, round, diag, floor, mean, cumsum, var, ceil, diff, atan
find, median, sort, unique, reshape, hist (compute histogram for given bin centers) conv (linear filtering with given mask)
Image processing functions:
rgb 2gray (compute luminance component)
imresize (scaling of image)
conv2 (averaging linear filtering)
bwlabel (labeling of connected components in binary images)
imdilate (dilation with given structuring element as binary mask)
imerode (erosion with given structuring element as binary mask)
imopen (erosion followed by dilation)
imclose (dilation followed by erosion)
bwmorph('remove') (extraction of a binary contour, is image minus erosion)
edge('canny') (Canny edge detection)

Example Matlab Implementation Structure of the Orb Detection

```
orb_demo   %(case 2)
    orb    %(implements thread 21A)
        orb_local_char %(the computation could be done in "orb")
        totalhe           %modified histogram equalization
        orb_center_radius
    orb_thresh
        %warning: the release implements an earlier version of thread 22A
% the documented version of 22A and 22B are under development
```

Detection of Airborne Flash Artifacts Using Preflash Image

The following alternative method uses a reference image, such as a preview or postview image, of substantially a same scene as a flash image, taken preferably without flash but could alternatively also be with flash, just before or after the acquisition of the actual image or main image. A reference image will typically have lower resolution than the main image, but it may have the same or higher resolution.

A different approach to detect the orbs is to use a reference image, e.g., a last preview image, of a scene. Since this reference image is preferably taken without flash, it offers a clean version of the scene, providing a baseline of the image content, although because the flash artifacts would differ, it is alternatively possible to use a flash image as the reference image. Obtaining such a baseline image implies the color calibration of the reference image to the final image, based on a linear transformation of the RGB color channels. The transformation may be obtained by a minimal mean square error matching of colors selected from the reference and the final images in uniform regions at the same spatial location.

Some background work by the same assignee as the present application involving use of reference images is found at the following US patents and patent applications, which are hereby incorporated by reference: U.S. patent application Ser. Nos. 60/945,558, 11/573,713, 60/773,714, 11/024,026, 10/608,772, PCT/US2006/021393, 10/608,784, 10/985,657, 11/462,035, 11/282,954, 11/233,513, 11/182,718, 11/123, 971, 10/976,366, 11/460,218, 60/776,338, 11/464,083, 11/674,650, 60/821,956, 10/919,226, 10/676,823, 11/573, 713, 11/421,027, 11/319,766, 11/744,020, FN-207, 11/752, 925, 11/767,412, and 11/464,083. U.S. Pat. No. 6,859,565 is also incorporated by reference in this context.

Processing of flash/non-flash images can be combined for the removal of certain flash defects from images captured in a digital camera. In particular, U.S. Pat. Nos. 6,859,565 and 7,027,662 and US published application 2005/0041121 describe methods for capturing a non-flash image and using this as a reference image for a second image captured using flash illumination.

U.S. Pat. Nos. 6,859,565 and 7,027,662, to Baron, teach reducing flash eye artifacts, e.g., red-eye, as well as specular reflections, by normalizing luminances between the two images and subtracting the non-flash image from the flash image. The differences (above a certain threshold) are deemed to be regions of the image where flash defects have occurred.

US published application no. 2005/0041121 teaches using a lower resolution preview image with short-exposure time (and commonly available in a state-of-art digital camera) as the reference image. This involves the up-scaling of the preview image and preferably aligning it with the main acquired image. This significantly improves the accuracy with which flash induced image defects can be determined.

Specular reflections from dust, water vapor or other airborne artifacts are described herein. Such artifacts typically have a well-defined, but thin boundary which may not appear as a contiguous circle unless the reference image is accurately upscaled and aligned with the main acquired image. Furthermore, the inner region of a specular reflection may only cause a slight reduction in luminance levels which may be below typical resolution thresholds for measuring differences between reference (non-flash) and flash images.

Unfortunately, certain flash artifacts do not exhibit a uniform distribution of luminance and texture and it is difficult to accurately locate and define such defects. The effects of specular reflections on an image are more difficult to correct than the effects of flash-eye where a reduction in luminance and a de-saturation of the red color may be sufficient to normalize the appearance of red-eyes. Proper correction of specular reflections involves very accurate matching of the reference and flash images.

An advantageous technique is provided herein to detect and locate the presence of specular reflections in an image, which allows better matching between reference and flash images. This can be broadly separated into two processes which may be applied separately, or con-currently, depending on a particular embodiment. The first process involves better defining the sharp, but thin boundary or edge of a specular reflection in the image. The second involves more accurately matching the background luminance of the two images with a view to obtaining a significantly lower threshold difference between the two images, which in turn enables the inner region of a specular reflection to be more accurately measured during the detection process.

Definition of Boundary of Specular Reflection

A useful technique is described by Yu et al. in a paper entitled: "Detecting circular and rectangular particles based on geometric feature detection in electron micrographs" originally published in Journal of Structural Biology 145, pp 168-180 (2004), which is incorporated by reference. Techniques described by Zhu et al. in "Fast detection of generic biological particles in cryo-EM images through efficient Hough transforms" in the Proceedings of the 2002 IEEE International Symposium for Biomedical Imaging pp 205-208, which is incorporated by reference, are also instructive.

In a technique in accordance with a preferred embodiment, an initial upscaling and aligning of the reference and flash-images is performed. In addition, luminance is normalized across the two images, and the reference image is then subtracted from the flash image.

Next, the difference image is optionally scaled and/or thresholded. In the scaling, "differences" between the two images, typically in the luminance domain, may be multiplied by a scaling factor. This could be a simple constant (linear scaling), or it could be non-linear to better emphasize larger differences. In certain embodiments, the scaling function may be adjusted according to the conditions of acquisition, or based on scene analysis or other pertinent information which was available at the time of acquisition. For example, networked camera data received from other networked devices could be used to assist in determining the conditions of image acquisition.

After scaling, an optional thresholding may be employed, or thresholding may be applied without scaling in an alternative embodiment. This thresholding discards any values of the difference (grayscale) image which are below a certain threshold. The effects of thresholding can also be achieved using a non-linear scaling function. The result is a grayscale difference image describing the luminance variations between the reference and flash images. This image can be treated using the above cited techniques and/or techniques involved in analyzing electron microscopy images may be used.

Specifically, in one embodiment, one or more of the following actions may now be taken: (i) applying anisoptropic filtering to the difference image; (ii) applying Canny edge detection followed by edge cleaning; (iii) computing a distance transform and/or Vornoi diagram of edges; and/or (iv) detecting geometric features (center and radius). In alternative embodiments the use of Canny edge detection and the distance transform (or Vornoi diagram) may be replaced with Hough transform techniques as described by Zhu et al. The process may optionally continue with techniques described by Yu et al., citation above, to eliminate overlapping candidates. This is not generally greatly advantageous in embodiments wherein it is preferred to employ a second approach to estimate the inner regions of a specular reflection. Thus, in embodiments where both edges and inside regions are detected, the remaining steps employed by Yu are not preferred, but may be applied in alternative embodiments according to the following: (v) determining from the geometric features a best guess for each specular reflection and computing "survival factor", as described in Yu et al; (vi) eliminating overlapping candidates (best survival factor); and/or (vii) recording a final list of candidate reflections.

Definition of the Interior Region of the Specular Reflection

The inner region of a specular reflection is characterized somewhat differently from the edge of the reflection. In particular, it exhibits smaller variations in the difference diagram between the reference and the flash images. Indeed, these variations are frequently so small that attempts to match the luminance levels of the reference and flash images involves natural variability which makes it difficult to distinguish the inner regions.

Thus, it is preferred to perform a more accurate matching of the background image luminance between reference and flash images in order to reliably distinguish such specular reflections. The preferred approach is based on the observation that there is very little variation in illumination of background regions of an image caused by a camera flash. Thus, background and foreground regions of an image are separated. Luminance matching is performed between the reference and flash images by first matching the background luminance between the two images, and then using this information to enhance the matching of the luminance of foreground regions between the two images.

A range of techniques for separating and refining the separation of foreground and background regions of a digital image pair are described in the applications cited and incorporated by reference above, many or all of which are assigned to the same assignee as the present application. In addition, information from an in-camera face tracker (again see above cited references) may be advantageously employed to suggest the locations (and distances) of foreground regions of an image.

Once foreground and background regions of the reference and flash image have been separated, it is more straightforward to match the luminance of the background regions of the two images. Information relating to the exposure times of the two images can be employed in this process, including relationships between exposure time and distance from camera and actual luminance recorded in the images. In this regard, US published applications nos. 2006/0039690 and US 20070126921 are incorporated by reference.

After the matching of the background regions, the foreground regions of each image are matched. This matching process is separate from the background process and uses additional techniques as variations in luminance over the foreground may vary over a wider range than over the background regions. For example, a global luminance matching may be adequate for the background regions of an image, but local luminance matching is desirable for the foreground regions.

More specifically, in certain embodiments it is advantageous to separate the foreground into more than one region. Where this is desired, then techniques such as "depth from defocus" can be readily employed (see, for example, U.S. application Ser. No. 11/573,713, which is incorporated by reference). Where DFD techniques are employed in this process, the foreground should be separated into two or three distance regions or more, e.g., one regions may be within one meter of the camera, a second region may be between one and two meters of the camera, and a third region may be from two to five meters from the camera.

In alternative embodiments, where more sophisticated distance to subject resolution is available (e.g., some cameras may employ a bright focus LED which can also provide some distance information), or where greater processing power enables the analysis of multiple preview images to provide improved DFD maps of the imaged scene, then a continuous or substantially continuous distance map of a scene might be available. In such embodiments, luminance matching may be performed according to a continuous function relating to the distance of the foreground from the camera. Such a function could be determined empirically and incorporated within a look-up table within the camera.

In other embodiments, the luminance matching of foreground regions may employ color information to assist in the luminance matching process. For example, skin color may likely to be a major component of the foreground regions of an image, and variations of skin color with varying illumination conditions is discernable. This information can greatly assist with matching the luminance of foreground regions. Following this process, an accurately matched pair of luminance images is achievable as follows.

The reference image is preferably now subtracted from the flash image. The resulting difference image may be scaled as described previously. Thresholding may also be applied, or it may be achieved through a non-linear scaling function, but in this case the thresholding is preferably used to remove the distinctive or large-difference edge regions, and thus it should be applied before the scaling. In this case the scaling is intended to increase the dynamic range of the small variations that occur across the inner regions of a specular reflection. This information is effectively recorded in a grayscale difference image.

In certain embodiments, edge detection may be applied prior to thresholding and that information may advantageously be employed in order to dynamically determine the appropriate threshold to eliminate the edge region. In other embodiments, lower thresholds are advantageously employed in order to eliminate the natural variations (effectively luminance noise) that occur in the luminance matching process.

The information contained in this grayscale mapping of the interiors of these specular reflections can advantageously be employed to assist in correcting such flash defects in an image. Such information is analogous to the statistical dust mapping techniques described in US published application no. 2005/0068452, which is incorporated by reference. Techniques such as infilling based on the level of distortion/occlusion caused by the dust for individual pixels can be applied here.

Flash On and Flash Off Image Processing

An ambient radiance map q may correspond to an image captured using an exposure value of 1 unit. For an exposure $E_a$ the ambient image captured by the camera (using a linear model, e.g.) may be $I_a = qE_a$. In the same manner, the flash radiance may correspond to an image strictly due to a unit of flash intensity. The image captured by the camera using flash would be $I_f = \phi P + qE_f$ where P is the power of the flash. It can be shown using optics equations understood by those skilled in the art that:

$$q = \frac{\rho B}{\pi}$$

$$\phi = \frac{\rho \cos\theta_F}{\pi d^2}$$

where B relates to object brightness, $\rho$ relates to object reflectance, d relates to the distance from object to the flash and $\theta_F$ relates to the angle between flash direction and surface normal. Therefore equations corresponding to the ambient and flash images become:

$$I_a = \frac{\rho B}{\pi} E_a$$

$$I_f = \frac{\rho \cos\theta_F}{\pi d^2} P + \frac{\rho B}{\pi} E_f$$

$I_a$ Image captured with no flash light $I_f$ Image captured with flash light

The exposures Ea and Ef have usually different values. Therefore, the ambient image would not be directly subtracted from the flash image to isolate only the flash component. The ambient image would be normalized to have the same exposure as the flash image. To normalize, the exposure can be written as: (using again a linear model)

$$E = k \cdot g \cdot T \cdot Iso$$

where k is a camera dependent constant, g relates to the gain applied to a CCD, T relates to the exposure time and Iso is related to a sensitivity of the CCD. As these values are known, the ambient image can be normalized as follows:

$$I_a^N = I_a\left(\frac{E_f}{E_a}\right) = I_a \frac{g_f T_f Iso_f}{g_a T_a Iso_a}$$

By subtracting, a difference image according to certain embodiments may be obtained:

$$Diff = I_f - I_a^N = \frac{\rho\cos\theta_F}{\pi \cdot d^2} P$$

The Diff image can be use to separate the Foreground from Background using an advantageous thresholding operation. As it can be seen from the formula above the closer the region is to the camera (d is small), the higher the difference value.

By dividing, a Ratio image may be obtained:

$$Ratio = \frac{I_f}{I_a^N} = 1 + \frac{P}{kg_f T_f Iso_f}\cos\theta_F \frac{1}{Bd^2}$$

The Ratio image can also be used to separate the Foreground object from Background. The higher the ratio value, the closer the region would be to the camera.

Combining Techniques

Specular reflections can be better detected by separating the process into two sub-processes. The first of these emphasizes the edge features of such reflections. The second removes the distinctive edges and focuses on more accurate luminance matching of regions within the image, specifically foreground and background regions. Improved luminance matching enables an increased dynamic range for the interior regions of these specular reflections to be achieved in the resulting difference map created from flash and non-flash (reference) images. Now, an optimal final detection of these artifacts is achieved by matching the edge regions detected by process 1 with the interior regions detected from process 2.

This matching process simplifies the techniques of Yu et al by replacing the calculation of survival factors and the elimination of overlapping candidates. The best match between edge and interior region will be the optimal candidate. False positives may be eliminated when there is not a good match between exterior and interior regions.

Where an interior region does not extend fully to the edge, it may be because there is little distortion caused towards the edge of the "pixie". Where the interior region extends beyond the edge of the "pixie" then some refinement of the grayscale map for the interior of that pixie may be advantageous, e.g., by adjustment of the lower cut-off threshold, or the scaling factor used for process 2. The output of the described technique is a final list of confirmed "pixie" regions and a grayscale map of the interior of each pixie which can be advantageously employed by a "pixie" correction algorithm.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

All references cited above, as well as that which is described as background, the invention summary, the abstract, the brief description of the drawings and the drawings are hereby incorporated by reference into the detailed description of the preferred embodiments as disclosing alternative embodiments.

We claim:

1. A method of using a processor to correct a flash image orb artifact arising from specular reflections from airborne particles, comprising:
   (a) acquiring an image of a scene using flash illumination;
   (b) acquiring a reference image of substantially the same scene;
   (c) subtracting the reference and flash images to generate a difference image;
   (d) determining an edge feature of an orb artifact within the difference image;
   (e) determining a feature of an interior region of an orb artifact within the difference image;
   (f) matching the edge feature with the feature of the interior region;
   (g) correcting the orb artifact from the flash image based on the matching, thereby generating a corrected image; and
   (h) displaying, transmitting, communicating or digitally storing or otherwise outputting the corrected image or a further processed version, or combinations thereof.

2. The method of claim 1, wherein the flash image and reference image are normalized prior to subtracting.

3. The method of claim 2, further comprising:
   (i) upsampling the reference image to match the size of the flash image and aligning the reference and flash images; and
   (ii) normalizing luminance across the reference and flash images, and
   (iii) wherein the subtracting comprises subtracting the upscaled, aligned and luminance normalized reference and flash images.

4. The method of claim 1, further comprising scaling the difference image.

5. The method of claim 1, further comprising thresholding the difference image.

6. The method of claim 5, further comprising scaling the difference image after the thresholding.

7. The method of claim 6, further comprising edge detection prior to said thresholding.

8. The method of claim 1, further comprising color calibrating the reference and flash images based on a transformation of RGB color channels, including matching of colors selected from the reference and flash images within regions at substantial a same location within said scene.

9. The method of claim 8, further comprising:
   (i) matching background regions of the reference and flash images including global luminance matching; and
   (ii) matching foreground regions of the reference and flash images including local luminance matching.

10. The method of claim 9, wherein the matching of foreground regions comprises matching multiple foreground regions including separating the multiple foreground regions based on distance.

11. The method of claim 10, wherein the separating based on distance comprises depth from defocus mapping of the foreground regions.

12. The method of claim 9, wherein the matching of foreground regions comprises color luminance matching.

13. The method of claim 12, wherein the color luminance matching comprises analyzing skin color variation due to luminance variation between the reference and flash images.

14. The method of claim 1, wherein the determining of an interior region includes the creation of a map of difference variations within the interior region and the correcting of the orb artifact includes applying the map to determine the correction to be applied to one or more image pixels.

15. The method of claim 14, wherein the correcting further includes applying in-painting technique to correct pixels.

16. The method of claim 15, wherein difference variations are deemed to be too large to allow accurate correction of said pixels without applying in-painting.

17. The method of claim 1 wherein the correcting of the orb artifact employs in-painting techniques to correct pixels within the orb edge feature.

18. The method of claim 1, further comprising:
   (i) anisotropic filtering of the difference image;
   (ii) Canny edge detecting and edge cleaning;
   (iii) computing a distance transform or Vornoi diagram of edges, or both; and
   (iv) detecting edge features.

19. The method of claim 18, further comprising eliminating overlapping candidates.

20. The method of claim 19, wherein the eliminating of overlapping candidates comprises determining a survival factor of the specular reflection, and wherein the eliminating of overlapping candidates is based on best survival factor.

21. The method of claim 20, further comprising recording a final list of candidate reflections.

22. The method of claim 1, further comprising:
   (i) matching background regions of the reference and flash images including glocal luminance matching; and
   (ii) matching foreground regions of the reference and flash images including local luminance matching.

23. The method of claim 1, further comprising generating a luminance difference map based on luminance matching at least of the interior region.

24. A method of using a processor to correct a flash image orb artifact arising from specular reflections from airborne particles, comprising:
   (a) acquiring an image of a scene using flash illumination;
   (b) acquiring a reference image of substantially the same scene;
   (c) color calibrating the reference and flash images based on a transformation of RGB color channels, including matching of colors selected from the reference and flash images within regions at substantially a same location within said scene;
   (d) removing an orb artifact from the flash image based on the color calibrating, thereby generating a corrected image; and
   (e) displaying, transmitting, communicating or digitally storing or otherwise outputting the corrected image or a further processed version, or combinations thereof.

25. The method of claim 24, further comprising:
   (i) upscaling and aligning the reference and flash images; and
   (ii) normalizing luminance across the reference and flash images, and
   (iii) wherein the subtracting comprises subtracting the upscaled, aligned and luminance normalized reference and flash images.

26. The method of claim 24, further comprising scaling the difference image.

27. The method of claim 24, further comprising thresholding the difference image.

28. The method of claim 26, further comprising scaling the difference image after the thresholding.

29. The method of claim 28, further comprising edge detection prior to said thresholding.

30. The method of claim 24, further comprising:
   (i) matching background regions of the reference and flash images including glocal luminance matching; and
   (ii) matching foreground regions of the reference and flash images including local luminance matching.

31. The method of claim 30, wherein the matching of foreground regions comprises matching multiple foreground regions including separating the multiple foreground regions based on distance.

32. The method of claim 31, wherein the separating based on distance comprises depth from defocus mapping of the foreground regions.

33. The method of claim 30, wherein the matching of foreground regions comprises color luminance matching.

34. The method of claim 33, wherein the color luminance matching comprises analyzing skin color variation due to luminance variation between the reference and flash images.

35. The method of claim 24, further comprising generating a color difference map based on the matching of colors.

36. The method of claim 24, further comprising:
   (i) determining an edge feature of the airborne artifact within the difference image;
   (ii) determining an interior region of the airborne artifact within the difference image; and
   (iii) matching the edge feature with the interior region.

37. The method of claim 24, wherein the determining of an interior region includes the creation of a map of difference variations within the interior region and the correcting of the orb artifact includes applying the map to determine the correction to be applied to one or more image pixels.

38. The method of claim 37, wherein the correcting further includes applying in-painting technique to correct pixels.

39. The method of claim 38, wherein difference variations are deemed to be too large to allow accurate correction of said pixels without applying in-painting.

40. The method of claim 24, wherein the correcting of the orb artifact employs in-painting techniques to correct pixels within the orb edge feature.

41. A method of using a processor to correct a flash image orb artifact arising from specular reflections from airborne particles, comprising:
   (a) acquiring an image of a scene using flash illumination;
   (b) acquiring a reference image of substantially the same scene;
   (c) matching background regions of the reference and flash images including global luminance matching, or matching foreground regions of the reference and flash images including local luminance matching, or matching both the foreground regions and the background regions of the reference and flash images including respectively global and local luminance matching; and
   (d) removing an orb artifact from the flash image based on the foreground or background matching, or based on both foreground matching and background matching, thereby generating a corrected image; and (e) displaying, transmitting, communicating or digitally storing or otherwise outputting the corrected image or a further processed version, or combinations thereof.

42. The method of claim 41, wherein the matching of foreground regions comprises matching multiple foreground regions including separating the multiple foreground regions based on distance.

43. The method of claim 42, wherein the separating based on distance comprises depth from defocus mapping of the foreground regions.

44. The method of claim 41, wherein the matching of foreground regions comprises color luminance matching.

45. The method of claim 44, wherein the color luminance matching comprises analyzing skin color variation due to luminance variation between the reference and flash images.

46. The method of claim 41, further comprising generating a luminance difference map based on the global or local luminance matching, or both.

47. The method of claim 41, further comprising subtracting normalized versions of the reference and flash images to generate a difference image.

48. The method of claim 41, further comprising:
(i) determining an edge feature of the airborne artifact within the difference image;
(ii) determining an interior region of the airborne artifact within the difference image; and
(iii) matching the edge feature with the interior region.

49. The method of claim 41, wherein the matching comprises both matching background regions of the reference and flash images including global luminance matching, and matching foreground regions of the reference and flash images including local luminance matching.

50. The method of claim 49, wherein the removing comprises removing the orb artifact from the flash image based on both the foreground and background matching.

51. The method of claim 41, wherein the determining of an interior region includes the creation of a map of difference variations within the interior region and the correcting of the orb artifact includes applying the map to determine the correction to be applied to one or more image pixels.

52. The method of claim 51, wherein the correcting further includes applying in-painting technique to correct pixels.

53. The method of claim 52, wherein difference variations are deemed to be too large to allow accurate correction of said pixels without applying in-painting.

54. The method of claim 41, wherein the correcting of the orb artifact employs in-painting techniques to correct pixels within the orb edge feature.

55. One or more processor-readable media having program code embodied therein for programming one or more processors to perform a method of correcting a flash image orb artifact arising from specular reflections from airborne particles, the method comprising:
(a) acquiring an image of a scene using flash illumination;
(b) acquiring a reference image of substantially the same scene;
(c) subtracting the reference and flash images to generate a difference image;
(d) determining an edge feature of an orb artifact within the difference image;
(e) determining a feature of an interior region of an orb artifact within the difference image;
(f) matching the edge feature with the feature of the interior region; and (g) correcting the orb artifact from the flash image based on the matching.

56. The one or more media of claim 55, wherein the image and reference image are normalized prior to subtracting.

57. The one or more media of claim 55, the method further comprising scaling the difference image.

58. The one or more media of claim 55, the method further comprising thresholding the difference image.

59. The one or more media of claim 55, the method further comprising color calibrating the reference and flash images based on a transformation of RGB color channels, including matching of colors selected from the reference and flash images within regions at substantial a same location within said scene.

60. The one or more media of claim 55, wherein the determining of an interior region includes the creation of a map of difference variations within the interior region and the correcting of the orb artifact includes applying the map to determine the correction to be applied to one or more image pixels.

61. The one or more media of claim 55, wherein the correcting of the orb artifact employs in-painting techniques to correct pixels within the orb edge feature.

62. The one or more media of claim 55, the method further comprising:
(i) anisotropic filtering of the difference image;
(ii) Canny edge detecting and edge cleaning;
(iii) computing a distance transform or Vornoi diagram of edges, or both; and
(iv) detecting edge features.

63. The one or more media of claim 55, the method further comprising:
(i) matching background regions of the reference and flash images including glocal luminance matching; and
(ii) matching foreground regions of the reference and flash images including local luminance matching.

64. The one or more media of claim 55, the method further comprising generating a luminance difference map based on luminance matching at least of the interior region.

65. The one or more media of claim 55, wherein the correcting further includes applying in-painting technique to correct pixels.

66. The one or more media of claim 65, wherein the correcting of the orb artifact employs in-painting techniques to correct pixels within the orb edge feature.

67. One or more processor-readable media having program code embodied therein for programming one or more processors to perform a method of correcting a flash image orb artifact arising from specular reflections from airborne particles, the method comprising:
(a) acquiring an image of a scene using flash illumination;
(b) acquiring a reference image of substantially the same scene;
(c) color calibrating the reference and flash images based on a transformation of RGB color channels, including matching of colors selected from the reference and flash images within regions at substantially a same location within said scene; and
(d) removing an orb artifact from the flash image based on the color calibrating.

68. The one or more media of claim 67, the method further comprising:
(i) upscaling and aligning the reference and flash images; and
(ii) normalizing luminance across the reference and flash images, and (iii) wherein the subtracting comprises subtracting the upscaled, aligned and luminance normalized reference and flash images.

69. The one or more media of claim 67, the method further comprising scaling the difference image.

70. The one or more media of claim 67, the method further comprising thresholding the difference image.

71. The one or more media of claim 67, the method further comprising generating a color difference map based on the matching of colors.

72. The one or more media of claim 67, the method further comprising:
(i) determining an edge feature of the airborne artifact within the difference image;
(ii) determining an interior region of the airborne artifact within the difference image; and
(iii) matching the edge feature with the interior region.

73. The one or more media of claim 67, wherein the correcting further includes applying in-painting technique to correct pixels.

74. The one or more media of claim 73, wherein the correcting of the orb artifact employs in-painting techniques to correct pixels within the orb edge feature.

75. One or more processor-readable media having program code embodied therein for programming one or more processors to perform a method of correcting a flash image orb artifact arising from specular reflections from airborne particles, the method comprising:
(a) acquiring an image of a scene using flash illumination;
(b) acquiring a reference image of substantially the same scene;
(c) matching background regions of the reference and flash images including global luminance matching, or matching foreground regions of the reference and flash images including local luminance matching, or matching both the foreground regions and the background regions of the reference and flash images including respectively global and local luminance matching; and
(d) removing an orb artifact from the flash image based on the foreground or background matching, or based on both foreground matching and background matching.

76. The one or more media of claim 75, wherein the matching of foreground regions comprises matching multiple foreground regions including separating the multiple foreground regions based on distance.

77. The one or more media of claim 75, wherein the matching of foreground regions comprises color luminance matching.

78. The one or more media of claim 75, the method further comprising generating a luminance difference map based on the global or local luminance matching, or both.

79. The one or more media of claim 75, the method further comprising subtracting normalized versions of the reference and flash images to generate a difference image.

80. The one or more media of claim 75, the method further comprising:
(i) determining an edge feature of the airborne artifact within the difference image;
(ii) determining an interior region of the airborne artifact within the difference image; and
(iii) matching the edge feature with the interior region.

81. The one or more media of claim 75, wherein the matching comprises both matching background regions of the reference and flash images including global luminance matching, and matching foreground regions of the reference and flash images including local luminance matching.

82. The one or more media of claim 75, wherein the correcting further includes applying in-painting technique to correct pixels.

83. The one or more media of claim 75, wherein the correcting of the orb artifact employs in-painting techniques to correct pixels within the orb edge feature.

* * * * *